United States Patent
Jimichi et al.

(10) Patent No.: US 10,128,773 B2
(45) Date of Patent: Nov. 13, 2018

(54) ELECTRIC POWER CONVERSION DEVICE AND ELECTRIC POWER SYSTEM

(71) Applicant: Mitsubishi Electric Corporation, Chiyoda-ku (JP)

(72) Inventors: Takushi Jimichi, Chiyoda-ku (JP); Kimiyuki Koyanagi, Chiyoda-ku (JP); Takeshi Kikuchi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/564,402

(22) PCT Filed: Mar. 29, 2016

(86) PCT No.: PCT/JP2016/060187
§ 371 (c)(1),
(2) Date: Oct. 4, 2017

(87) PCT Pub. No.: WO2016/167117
PCT Pub. Date: Oct. 20, 2016

(65) Prior Publication Data
US 2018/0138826 A1    May 17, 2018

(30) Foreign Application Priority Data
Apr. 13, 2015 (JP) .................. 2015-081549

(51) Int. Cl.
*H02M 7/49* (2007.01)
*H02M 7/497* (2007.01)
(Continued)

(52) U.S. Cl.
CPC ........... *H02M 7/497* (2013.01); *H02J 3/1857* (2013.01); *H02M 7/062* (2013.01); *H02M 7/48* (2013.01);
(Continued)

(58) Field of Classification Search
CPC ............ H02M 7/06; H02M 7/08; H02M 7/12; H02M 7/42; H02M 7/44; H02M 7/48;
(Continued)

(56) References Cited

U.S. PATENT DOCUMENTS

2010/0327837 A1* 12/2010 Tsugawa ............... H02M 1/32
323/285
2011/0074489 A1* 3/2011 Viitanen ................ H02M 1/08
327/427

(Continued)

FOREIGN PATENT DOCUMENTS

JP    2012-029490 A    2/2012
JP    2013-121223 A    6/2013
(Continued)

OTHER PUBLICATIONS

Hagiwara, Makoto, et al., "*PWM Control and Experiment of Modular Multilevel Converters*", IEE Japan, Trans. IA, vol. 128, No. 7, pp. 957-965, with Extended Summary, p. 13, (10 pages).
(Continued)

*Primary Examiner* — Timothy J Dole
*Assistant Examiner* — Ivan Laboy Andino
(74) *Attorney, Agent, or Firm* — Oblon, McClelland, Maier & Neustadt, L.L.P.

(57) ABSTRACT

An electric power conversion device includes a first arm and a second arm each including converter cells. The converter cell of the first arm is a first converter cell having a full-bridge configuration including an energy storing element and semiconductor switching elements. The converter cell of the second arm is a second converter cell having a half-bridge configuration including an energy storing element and semiconductor switching elements. Thus, short-circuit current between DC terminals is suppressed.

18 Claims, 26 Drawing Sheets

(51) Int. Cl.
*H02M 7/483* (2007.01)
*H02M 7/5387* (2007.01)
*H02M 7/48* (2007.01)
*H02J 3/18* (2006.01)
*H02M 7/06* (2006.01)
*H02M 7/487* (2007.01)

(52) U.S. Cl.
CPC ............. *H02M 7/487* (2013.01); *H02M 7/49* (2013.01); *H02M 7/53871* (2013.01); *H02M 7/483* (2013.01); *H02M 2007/4835* (2013.01)

(58) Field of Classification Search
CPC ........ H02M 7/483; H02M 7/487; H02M 7/49; H02M 7/537; H02M 7/5387; H02M 7/5388; H02M 2007/4835; H02M 1/32; H02M 2001/322; H02M 2001/325; H02M 7/493; H02M 7/217; H02M 7/219; H02M 7/797; H02J 3/36; H02H 9/041; H02H 9/043; H02H 7/1227; H02H 7/1257
See application file for complete search history.

(56) References Cited

U.S. PATENT DOCUMENTS

| | | | |
|---|---|---|---|
| 2011/0096580 A1* | 4/2011 | Asplund | H02J 3/36 363/132 |
| 2013/0128636 A1* | 5/2013 | Trainer | H02J 3/1857 363/65 |
| 2013/0148392 A1 | 6/2013 | Inoue et al. | |
| 2015/0222201 A1* | 8/2015 | Nakashima | H02M 7/487 363/131 |
| 2015/0340859 A1* | 11/2015 | Barker | H02H 3/07 361/62 |
| 2015/0357905 A1 | 12/2015 | Nami et al. | |
| 2015/0372612 A1* | 12/2015 | Nami | H02M 7/219 363/123 |
| 2016/0072267 A1* | 3/2016 | Fu | H02G 7/16 219/488 |
| 2017/0070047 A1* | 3/2017 | Shen | H02J 3/36 |
| 2017/0163170 A1* | 6/2017 | Tahata | H02M 7/155 |

FOREIGN PATENT DOCUMENTS

| | | | |
|---|---|---|---|
| JP | 2014-79048 A | 5/2014 | |
| JP | 2015-012726 A | 1/2015 | |
| WO | 2011/012174 A1 | 2/2011 | |
| WO | 2014/111164 A1 | 7/2014 | |
| WO | 2014/111595 A1 | 7/2014 | |
| WO | WO 2015110185 A1 * | 7/2015 | ............ H02M 7/483 |

OTHER PUBLICATIONS

Shibano, Yuji, et al., "*A Phase-Shifted PWM STATCOM Using the Modular Multilevel Cascade Converter*", IEE Japan, Trans. IA, vol. 133, No. 9, (2013), pp. 928-935.

International Search Report dated Jun. 21, 2016 in PCT / JP2016/ 060187, filed on Mar. 29, 2016.

* cited by examiner

FIG. 2
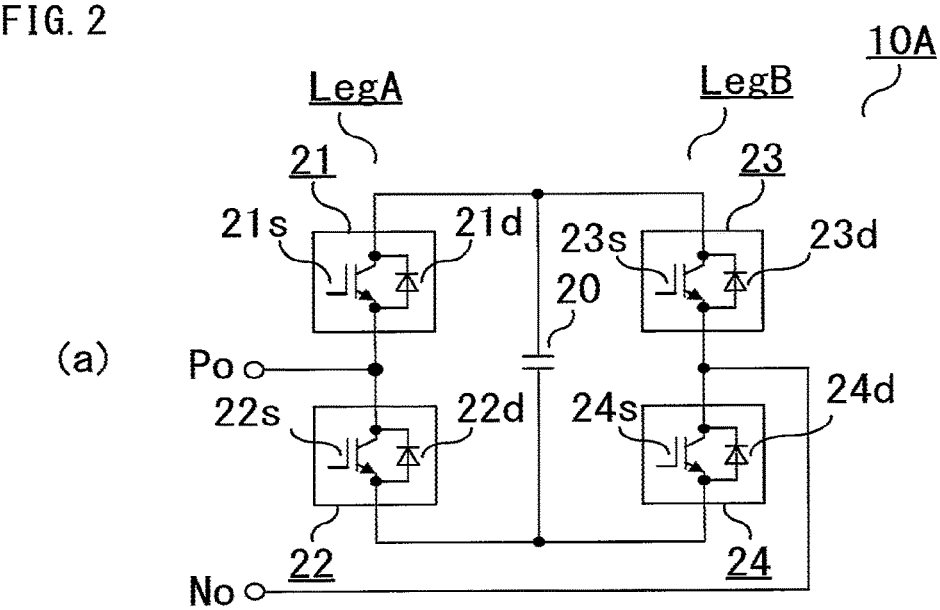
(a)
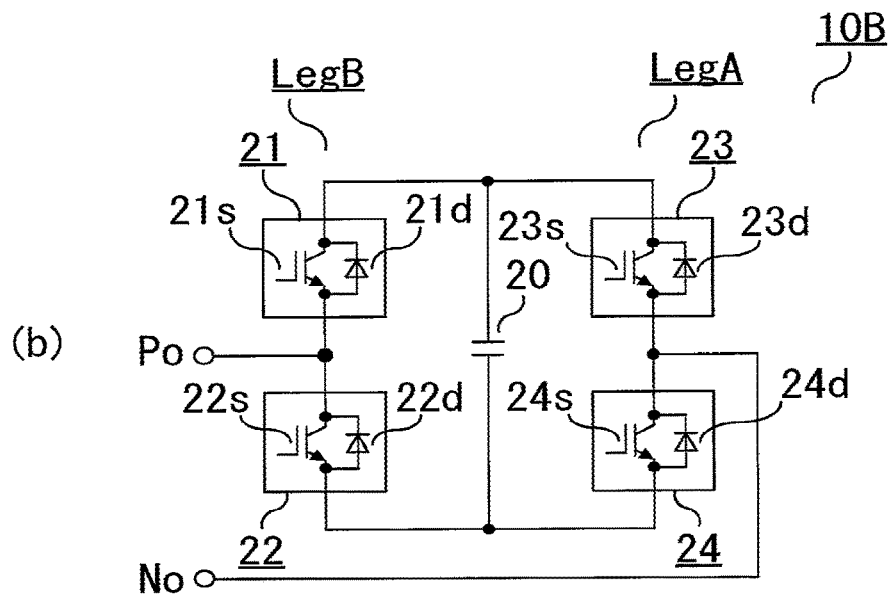
(b)

FIG. 3
(a)
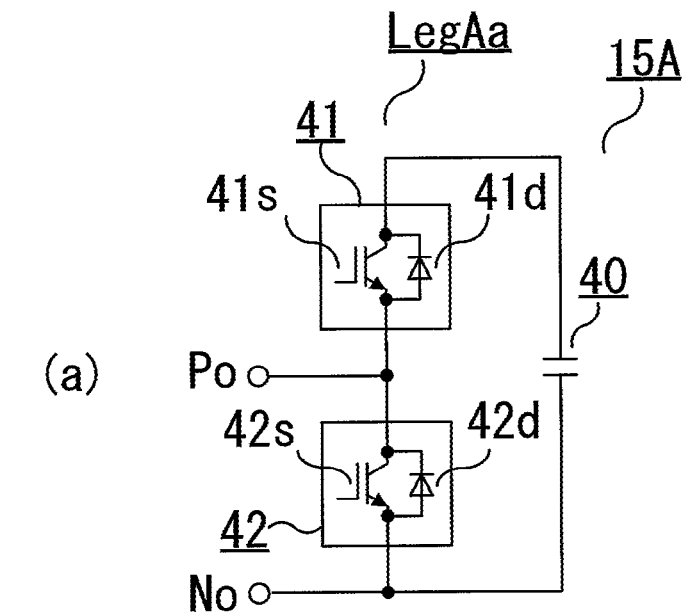
(b)
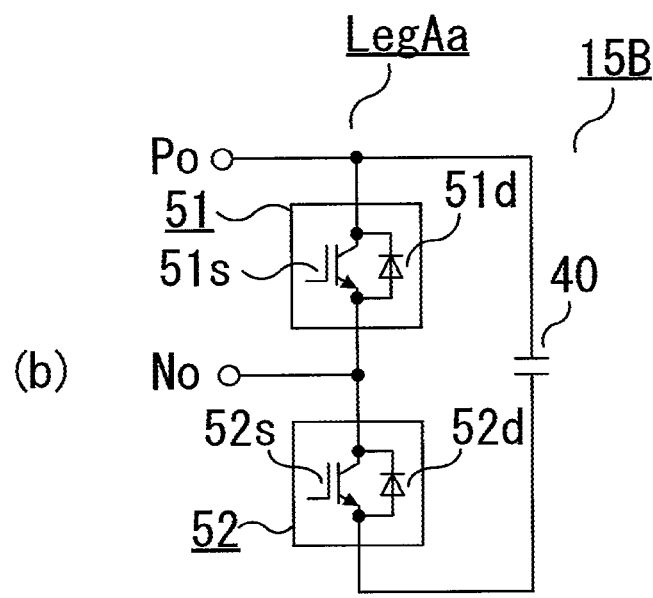

FIG. 4

| | SW STATE | | | | OPERATION MODE |
|---|---|---|---|---|---|
| | 21s | 22s | 23s | 24s | |
| MODE 1 | ON | OFF | OFF | ON | VOLTAGE BETWEEN BOTH ENDS OF CAPACITOR |
| MODE 2 | OFF | ON | OFF | ON | ZERO VOLTAGE |
| MODE 3 | ON | OFF | ON | OFF | ZERO VOLTAGE |
| MODE 4 | OFF | ON | ON | OFF | NEGATIVE VOLTAGE BETWEEN BOTH ENDS OF CAPACITOR |
| MODE 5 | OFF | OFF | OFF | OFF | PROTECTION MODE |

FIG. 5

| | OPERATION MODE | | OPERATION MODE |
|---|---|---|---|
| | 41s, 52s | 42s, 51s | |
| MODE 1 | ON | OFF | VOLTAGE BETWEEN BOTH ENDS OF CAPACITOR |
| MODE 2 | OFF | ON | ZERO VOLTAGE |
| MODE 3 | OFF | OFF | PROTECTION MODE |

FIG. 9
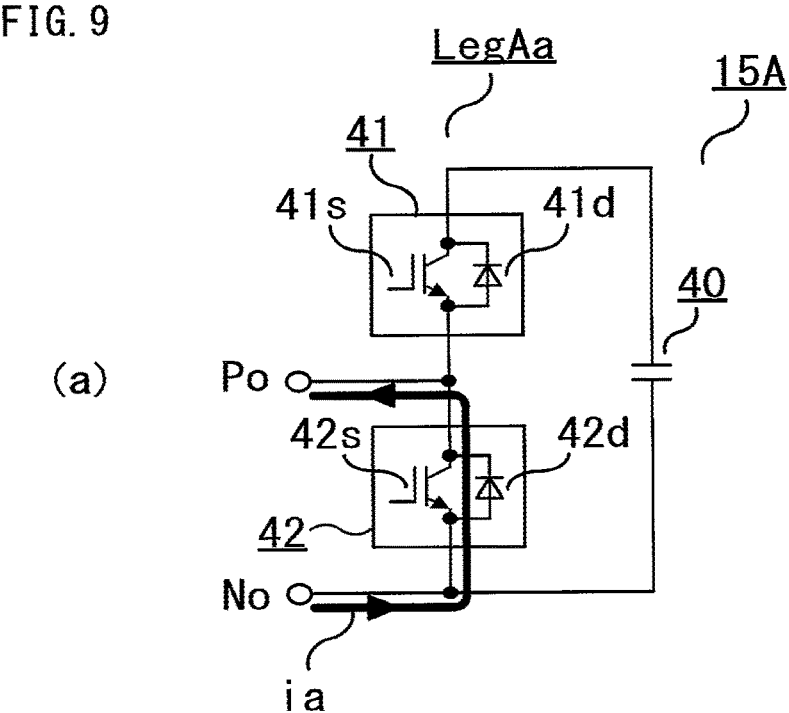
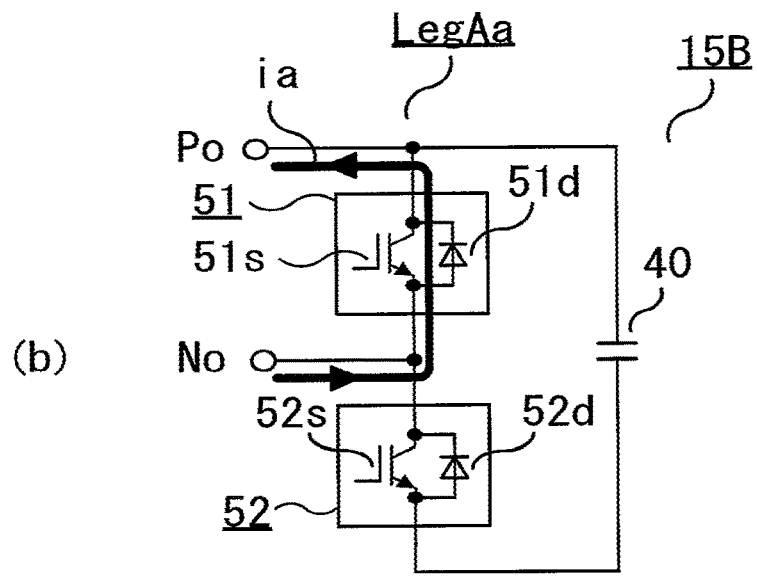

ELECTRIC POWER CONVERSION DEVICE AND ELECTRIC POWER SYSTEM

TECHNICAL FIELD

The present invention relates to an electric power conversion device which performs power conversion between multiphase AC and DC, and in particular, relates to a large-capacity electric power conversion device with multiplexed converters, and an electric power system including the electric power conversion device.

BACKGROUND ART

In large-capacity electric power conversion devices, the converter output is high voltage or large current, and therefore, many large-capacity electric power conversion devices are configured with a plurality of converters multiplexed in series or parallel. Multiplexing converters enables not only increase in the converter capacity, but also reduction in harmonics contained in an output voltage waveform by synthesizing outputs. As a result, harmonic current flowing to a grid can be reduced.

As means for multiplexing converters, there is known a modular multilevel converter in which outputs of a plurality of converters are connected in cascade. Each arm of the modular multilevel converter is composed of a plurality of converter cells connected in cascade.

In a conventional modular multilevel converter, each of a first arm and a second arm for each phase, which are provided between an AC terminal for each phase and positive and negative DC terminals, has a chopper cell (converter cell) and a reactor. The chopper cell has two semiconductor switching elements connected in series to each other, and a DC capacitor connected in parallel thereto. In each of the first arm and the second arm, the same number of chopper cells are connected in series via their respective output ends. Using voltage commands for the first arm and the second arm, semiconductor switching elements in the chopper cells in the first arm and the second arm are ON/OFF controlled, thereby generating AC voltage at the AC terminal and DC voltage at the DC terminals (see, for example, Non-Patent Document 1).

Another modular multilevel converter is disclosed which uses a multilevel circuit in which a converter cell has semiconductor switching elements in a full-bridge form, for the purpose of suppressing short-circuit current that occurs when DC terminals P, N are short-circuited (see, for example, Patent Document 1).

Further, a Static Synchronous Compensator (STATCOM) using a modular multilevel converter of star-connection type in which AC sides of converter cells are connected in series for each phase, is proposed (see, for example, Non-Patent Document 2).

CITATION LIST

Patent Document

Patent Document 1: International Publication No. WO2011/012174A1

Non-Patent Document

Non-Patent Document 1: Makoto Hagiwara, Hirofumi Akagi, "PWM Control and Experiment of Modular Multilevel Converters (MMC)", 2008, IEEJ, vol. 128, no. 7, pp. 957-965

Non-Patent Document 2: Yuji Shibano, Joao I. Yutaka Ota, Naoto Niimura, Hirofumi Akagi, "A Phase-Shifted PWM STATCOM Using the Modular Multilevel Cascade Converter (MMCC-SSBC)", 2013, IEEJ, vol. 133, no. 9, pp. 928-935

SUMMARY OF THE INVENTION

Problems to be Solved by the Invention

In a conventional electric power conversion device that performs power conversion between multiphase AC and DC using the modular multilevel converter shown in Non-Patent Document 1, excessive short-circuit current flows when DC short-circuit occurs, and thus elements in the converter might be deteriorated.

In the case of using the modular multilevel converter shown in Patent Document 1, short-circuit current can be suppressed when DC short-circuit occurs. However, since each converter cell is configured by a full-bridge circuit, the number of semiconductor switching elements increases, and thus the size of the device configuration becomes large.

A conventional electric power conversion device using the modular multilevel converter shown in Non-Patent Document 2 cannot be used for power conversion between multiphase AC and DC.

The present invention has been made to solve the above problems, and an object of the present invention is to provide, at low cost, a small-sized electric power conversion device that is capable of large-capacity power conversion between multiphase AC and DC and can suppress short-circuit current when DC terminals are short-circuited.

Solution to the Problems

An electric power conversion device according to the present invention includes: a power converter including a plurality of leg circuits connected in parallel between positive and negative DC terminals, each leg circuit including a first arm and a second arm connected in series and a connection point therebetween being connected to an AC terminal for each phase, the first arm and the second arm each including one or a plurality of converter cells connected in series, each converter cell including an energy storing element and a first bridge having upper and lower arms both having semiconductor switching elements, the power converter performing power conversion between multiphase AC and DC; and a control device for controlling the power converter. The converter cell in the first arm of each leg circuit is a first converter cell having a full-bridge configuration including the energy storing element, the first bridge, and a second bridge having upper and lower arms both having semiconductor switching elements. The converter cell in the second arm of each leg circuit is a second converter cell having a half-bridge configuration including the energy storing element and the first bridge.

An electric power system according to the present invention includes a plurality of the electric power conversion devices configured as described above, and the DC terminals of the power converters of the electric power conversion devices are connected to each other.

Effect of the Invention

The electric power conversion device according to the present invention can suppress short-circuit current when the DC terminals are short-circuited. Further, it is possible to provide an electric power conversion device that enables size reduction and cost reduction of the device configuration and has high reliability.

The electric power system according to the present invention is composed of a plurality of the electric power conversion devices which are connected to each other on the DC sides and each of which is capable of suppressing short-circuit current when the DC terminals are short-circuited. Thus, it is possible to provide a highly reliable electric power system that can treat great DC power.

BRIEF DESCRIPTION OF THE DRAWINGS

FIG. 2 is a diagram showing a circuit configuration of each first converter cell in a first arm according to embodiment 1 of the present invention.

FIG. 3 is a diagram showing a circuit configuration of each second converter cell in a second arm according to embodiment 1 of the present invention.

FIG. 4 is a diagram showing a switching state of each semiconductor switching element of the first converter cell and an output state of the first converter cell, according to embodiment 1 of the present invention.

FIG. 5 is a diagram showing a switching state of each semiconductor switching element of the second converter cell and an output state of the second converter cell, according to embodiment 1 of the present invention.

FIG. 9 is a diagram showing a route of short-circuit current in the second converter cell according to embodiment 1 of the present invention.

DESCRIPTION OF EMBODIMENTS

Embodiment 1

Hereinafter, an electric power conversion device 100 according to embodiment 1 of the present invention will be described with reference to the drawings.

Figure 1:
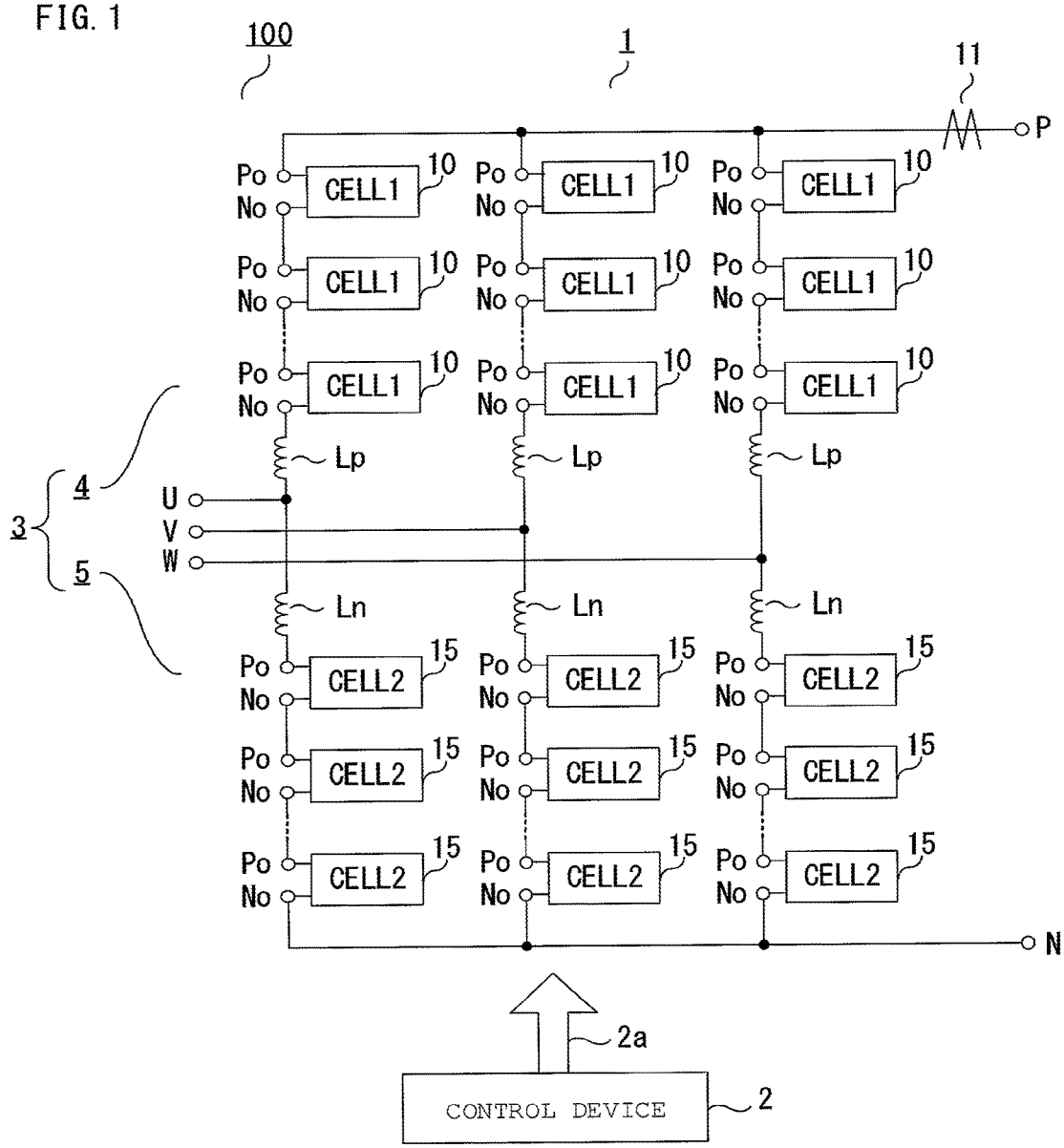
FIG. 1 is a schematic configuration diagram showing an electric power conversion device according to embodiment 1 of the present invention.

FIG. 1 is a schematic configuration diagram showing the electric power conversion device 100 according to embodiment 1 of the present invention.

As shown in FIG. 1, the electric power conversion device 100 includes a power converter 1 which is a main circuit, and a control device 2 for controlling the power converter 1. The power converter 1 performs power conversion between DC and three-phase AC as multiphase AC. The AC side of the power converter 1 is connected to the AC terminals U, V, W, and the DC side thereof is connected to the DC terminals P, N.

The power converter 1 includes three leg circuits 3 for U phase, V phase, and W phase. Each leg circuit 3 includes a first arm 4 formed from a plurality of first converter cells 10 connected in series, and a second arm 5 formed from a plurality of second converter cells 15 connected in series, and is formed by the first arm and the second arm being connected in series. Each leg circuit 3 is connected in parallel between the positive and negative DC terminals P, N. A connection point between the first arm 4 and the second arm 5 of each leg circuit 3 is connected to the corresponding one of the AC terminals U, V, W for respective phases.

In the present embodiment, the first arm 4 of each leg circuit 3 is composed of a plurality of converter cells 10, but may be composed of only one first converter cell 10. Similarly, the second arm 5 of each leg circuit 3 is composed of a plurality of converter cells 15, but may be composed of only one second converter cell 15.

A positive-side reactor Lp is connected in series to each first arm 4, and a negative-side reactor Ln is connected in series to each second arm 5.

A current detector 11 is connected on the DC terminal P side, and detects current flowing through the DC terminal P.

FIG. 2(a) and FIG. 2(b) are diagrams showing circuit configurations of first converter cells 10 in each first arm 4 according to embodiment 1 of the present invention. It is noted that, in the embodiment described later, the first converter cells 10 have other circuit configurations, and the first converter cells 10 used in the present embodiment are referred to as first converter cells 10A, 10B.

As shown in FIG. 2(a), the first converter cell 10A has a full-bridge configuration including a capacitor 20 as an energy storing element, and two bridges (Leg A as a first bridge, Leg B as a second bridge) connected in parallel to the capacitor 20. The first bridge Leg A has, at an upper arm, a semiconductor switch 21 in which a flyback diode 21d is connected in antiparallel to a semiconductor switching element 21s. Further, the first bridge Leg A has, at a lower arm, a semiconductor switch 22 in which a flyback diode 22d is connected in antiparallel to a semiconductor switching element 22s. The semiconductor switch 21 and the semiconductor switch 22 are connected in series. The second bridge Leg B has, at an upper arm, a semiconductor switch 23 in which a flyback diode 23d is connected in antiparallel to a semiconductor switching element 23s. Further, the second bridge Leg B has, at a lower arm, a semiconductor switch 24 in which a flyback diode 24d is connected in antiparallel to a semiconductor switching element 24s. The semiconductor switch 23 and the semiconductor switch 24 are connected in series.

As shown in FIG. 2(b), the first converter cell 10B is obtained by reversing the first bridge Leg A and the second bridge Leg B of the first converter cell 10A. That is, in the first converter cell 10B, the bridge having the semiconductor switching elements 21s, 22s and connected to a positive output terminal Po is a Leg B as a second bridge, and the bridge having the semiconductor switching elements 23s, 24s and connected to a negative output terminal No is a Leg A as a first bridge.

In the present embodiment, as described above, the first converter cell 10A and the first converter cell 10B having different configurations are shown as the first converter cells 10. No matter which is used for the power converter 1, the same effect is obtained in the present embodiment. Hereinafter, unless it is necessary to discriminate the first converter cell 10A and the first converter cell 10B, they are simply referred to as first converter cells 10.

The positive output terminal Po of the first converter cell 10 is provided at a connection point between the semiconductor switch 21 and the semiconductor switch 22, and the negative output terminal No of the first converter cell 10 is provided at a connection point between the semiconductor switch 23 and the semiconductor switch 24. As shown in FIG. 1, the positive output terminal Po of each first converter cell 10 is connected to the negative output terminal No of another converter cell 10.

FIG. 3(a) and FIG. 3(b) are diagrams showing circuit configurations of second converter cells 15 in the second arm 5 according to embodiment 1 of the present invention. It is noted that, in the embodiment described later, the second converter cells 15 have another circuit configuration, and in the present embodiment, the second converter cells 15 have two kinds of circuit configurations. Therefore, the second converter cells 15 used in the present embodiment are referred to as a second converter cell 15A and a second converter cell 15B.

The second converter cells 15A, 15B each have a half-bridge configuration including a capacitor 40 as an energy storing element, and a Leg Aa as a first bridge connected in parallel to the capacitor 40.

The first bridge Leg Aa of the second converter cell 15A shown in FIG. 3(a) has, at an upper arm, a semiconductor switch 41 in which a flyback diode 41d is connected in antiparallel to a semiconductor switching element 41s. Further, the first bridge Leg Aa has, at a lower arm, a semiconductor switch 42 in which a flyback diode 42d is connected in antiparallel to a semiconductor switching element 42s. The semiconductor switch 41 and the semiconductor switch 42 are connected in series. A positive output terminal Po of the second converter cell 15A is provided at a connection point between the semiconductor switch 41 and the semiconductor switch 42. A negative output terminal No of the second converter cell 15A is provided at a connection point between the capacitor 40 and the emitter side of the semiconductor switching element 42s.

The first bridge Leg Aa of the second converter cell 15B shown in FIG. 3(b) has, at an upper arm, a semiconductor switch 51 in which a flyback diode 51d is connected in antiparallel to a semiconductor switching element 51s. Further, the first bridge Leg Aa has, at a lower arm, a semiconductor switch 52 in which a flyback diode 52d is connected in antiparallel to a semiconductor switching element 52s. The semiconductor switch 51 and the semiconductor switch 52 are connected in series. A negative output terminal No of the second converter cell 15B is provided at a connection point between the semiconductor switch 51 and the semiconductor switch 52. A positive output terminal No of the second converter cell 15A is provided at a connection point between the capacitor 40 and the collector side of the semiconductor switching element 51s.

In the present embodiment, as described above, the second converter cell 15A and the second converter cell 15B having different circuit configurations are shown as the second converter cells 15. No matter which is used for the power converter 1, the same effect is obtained in the present embodiment. Hereinafter, unless it is necessary to discriminate the second converter cell 15A and the second converter cell 13B, they are simply referred to as second converter cells 15.

As shown in FIG. 1, the positive output terminal Po of each second converter cell 15 is connected to the negative output terminal No of another converter cell 15.

In the present embodiment, all the converter cells in each first arm 4 are the first converter cells 10 having full-bridge configurations described above, and all the converter cells in each second arm 5 are the second converter cells 15 having half-bridge configurations described above.

As the above semiconductor switching elements, semiconductor switching elements such as IGBT (Insulated-Gate Bipolar Transistor), GCT (Gate Commutated Turn-off thyristor), or MOSFET (Metal-Oxide-Semiconductor Field-Effect Transistor) are used. In the case of using semiconductor switching elements including diodes (body diodes), the above flyback diodes may be omitted.

Next, an operation mode of the first converter cell 10A will be described with reference to the drawings.

FIG. 4 is a diagram showing a switching state (shown as SW STATE in FIG. 4) of each semiconductor switching element 21s to 24s of the first converter cell 10 and an output state (shown as OPERATION MODE in FIG. 4) of the first converter cell 10, according to embodiment 1 of the present invention.

When the semiconductor switching elements 21s, 24s are ON and the semiconductor switching elements 22s, 23s are OFF, voltage between both ends of the capacitor 20 is outputted between the output terminals Po, No of the first converter cell 10 (mode 1).

When the semiconductor switching elements 22s, 24s are ON and the semiconductor switching elements 21s, 23s are OFF, zero voltage is outputted (mode 2).

When the semiconductor switching elements 21s, 23s are ON and the semiconductor switching elements 22s, 24s are OFF, zero voltage is outputted (mode 3).

When the semiconductor switching elements 22s, 23s are ON and the semiconductor switching elements 21s, 24s are OFF, negative voltage between both ends of the capacitor 20 is outputted between output terminals of the first converter cell 10A (mode 4).

When all the semiconductor switching elements 21s, 22s, 23s, 24s are OFF, the operation mode becomes a protection mode, and the first converter cell 10A operates as a diode rectifier (mode 5). The details of the protection mode will be described later.

In switching between the above mode 1 and mode 4, a short-circuit preventing period called a dead time may be provided. During the dead time, the semiconductor switching elements 21s, 22s of the first bridge Leg A and the semiconductor switching elements 23s, 24s of the second bridge Leg B are all turned off.

By using PWM (Pulse-Width Modulation) control, average voltage in one cycle of switching can be made equal to desired voltage (a voltage command desired by the inventors). For example, if the mode 1 and the mode 4 shown in FIG. 4 are switched at a time ratio of 1:1, the average output voltage becomes zero and thus output equivalent to those in mode 2 and mode 3 in FIG. 4 can be obtained.

Next, an operation mode of the second converter cell 15 will be described with reference to the drawings.

FIG. 5 is a diagram showing a switching state (shown as SW in FIG. 5) of each semiconductor switching element 41s, 42s of the second converter cell 15A and each semiconductor switching element 51s, 52s of the second converter cell 15B, and an output state (shown as OPERATION MODE in FIG. 5) of the second converter cell 15A, 15B, according to embodiment 1 of the present invention.

When the semiconductor switching element 41s (52s) is ON and the semiconductor switching element 42s (51s) is OFF, voltage between both ends of the capacitor 40 is outputted between the output terminals Po, No of the second converter cell 15A, 15B (mode 1).

When the semiconductor switching element 42s (51s) is ON and the semiconductor switching element 41s (52s) is OFF, zero voltage is outputted (mode 2).

When all the semiconductor switching elements 41s, 42s, 51s, 52s are OFF, the operation mode becomes a protection mode (mode 3).

If voltages of the capacitors 20, 40 are equal to each other, output voltage in mode 1 (voltage between both ends of the capacitor 20 is outputted) of the first converter cell 10A shown in FIG. 4 is equivalent to output voltage in mode 1 (voltage between both ends of the capacitor 40 is outputted) of the second converter cell 15A, 15B shown in FIG. 5. In addition, output voltage in mode 2 and mode 3 (zero voltage output) of the first converter cell 10A shown in FIG. 4 is equivalent to output voltage in mode 2 (zero voltage output) of the second converter cell 15A, 15B shown in FIG. 5.

In the present embodiment, the first converter cell 10A is controlled by only mode 1, mode 2, and mode 5. In the case where the first converter cell 10A is thus controlled by only mode 1, mode 2, and mode 5, the semiconductor switching element 23s in the second bridge Leg B of the first converter cell 10A is always fixed in an OFF state. In addition, in this case, during steady operation except in the protection mode, the semiconductor switching element 24s is always fixed in an ON state and does not perform switching operation. It is noted that the protection mode is control used when the DC terminals are short-circuited as described later.

In the steady operation, if the semiconductor switching elements 23s, 24s in the second bridge Leg B of the first converter cell 10A are fixed in an ON state or an OFF state so that switching operation is not performed, switching control for the first bridge Leg A of the first converter cell 10A is equivalent to switching control for the first bridge Leg Aa of the second converter cell 15A. Thus, the first converter cell 10A having a full-bridge configuration can be controlled in the same manner as the second converter cell 15A having a half-bridge configuration.

In the present embodiment, the first converter cell 10B is controlled by only mode 1, mode 3, and mode 5. In the case where the first converter cell 10B is thus controlled by only mode 1, mode 3, and mode 5, the semiconductor switching element 22s in the second bridge Leg B of the first converter cell 10B is always fixed in an OFF state. In addition, in this case, during the steady operation except in the protection mode, the semiconductor switching element 21s is always fixed in an ON state and does not perform switching operation.

In the steady operation, if the semiconductor switching elements 21s, 22s in the second bridge Leg B of the first converter cell 10B are fixed in an ON state or an OFF state so that switching operation is not performed, switching control for the first bridge Leg A of the first converter cell 10B is equivalent to switching control for the first bridge Leg Aa of the second converter cell 15B. Thus, the first converter cell 10B having a full-bridge configuration can be controlled in the same manner as the second converter cell 15B having a half-bridge configuration.

As described above, in the steady operation, the first converter cell 10 can be controlled in the same manner as the second converter cell 15 having a half-bridge configuration, by the second bridge Leg B being controlled in a fixed manner. Therefore, for example, the following control is performed using a control method described in Non-Patent Document 1.

The control device 2 calculates voltage commands for converter cells (first converter cell 10, second converter cell 15) of the first arms 4 and the second arms 5. The voltage command for each converter cell is calculated so as to generate desired AC voltage and DC voltage while controlling capacitor voltage by average value control for causing a DC voltage average value of each converter cell to follow a capacitor voltage command value, and balance control for balancing DC voltages of the converter cells. Then, on the basis of the calculated voltage commands, the control device 2 generates a control signal for performing switching control, by PWM, for the semiconductor switching elements in the first bridge Leg A of the first converter cell 10 and the second converter cell 15, i.e., the first bridge Leg A and the first bridge Leg Aa. This control signal is, together with a control signal for controlling the Leg B in a fixed manner, outputted as a control signal 2a from the control device 2 to each converter cell (first converter cell 10, second converter cell 15).

Hereinafter, in the second bridge Leg B, a switching element fixed in an ON state is referred to as an ON-fixed element, and an element fixed in an OFF state is referred to as an OFF-fixed element.

Hereinafter, a control operation of the electric power conversion device 100 according to embodiment 1 of the present invention will be described.

Figure 6:
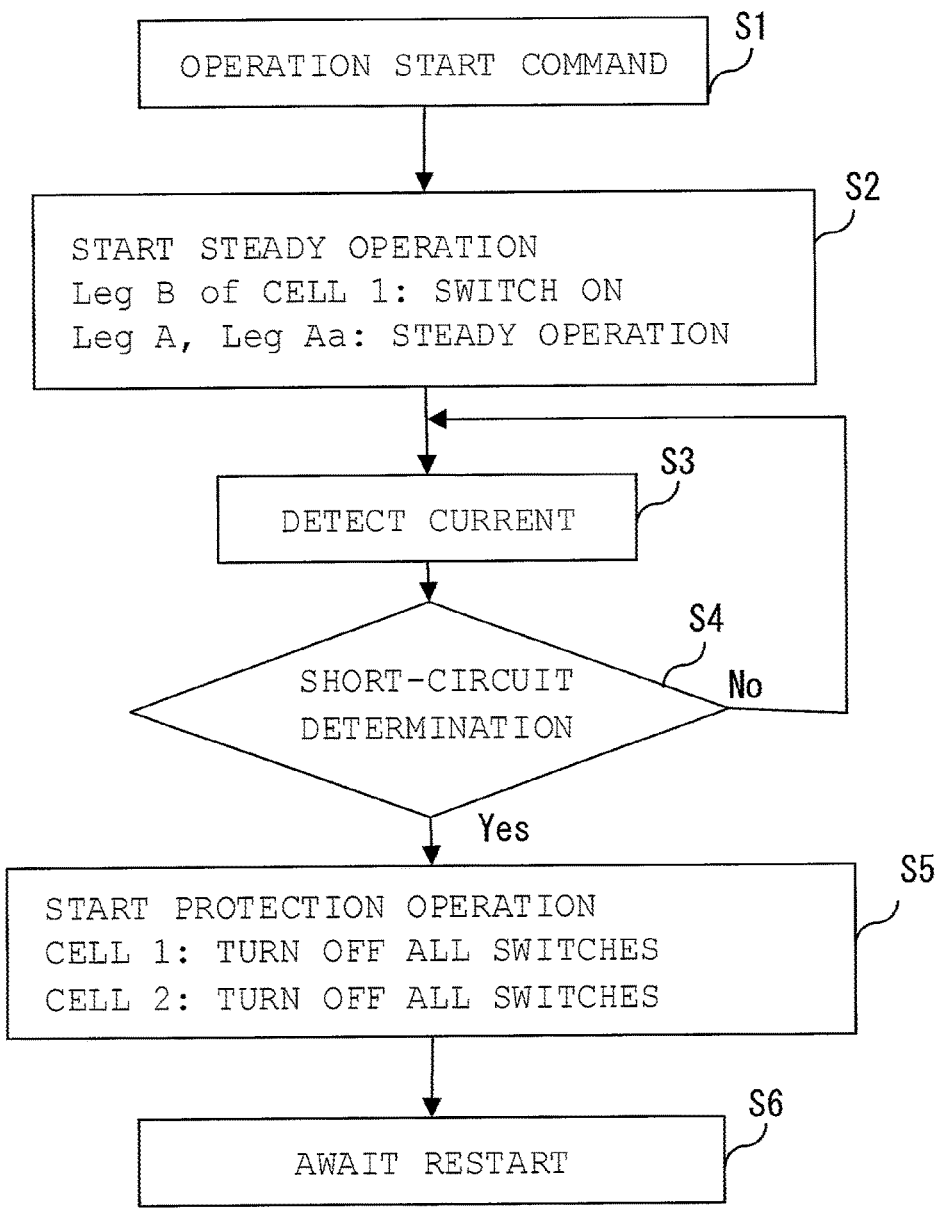
FIG. 6 is a flowchart showing control operation of the electric power conversion device according to embodiment 1 of the present invention.

FIG. 6 is a flowchart showing the control operation of the electric power conversion device 100 according to embodiment 1 of the present invention.

When an operation start command is outputted (step S1), the control device 2 starts steady operation (step S2). In the steady operation, the control device 2 fixes the semiconductor switching element 23s (22s) in the second bridge Leg B of the first converter cell 10A (10B) in the first arm 4 in an OFF state as an OFF-fixed element, and fixes the semiconductor switching element 24s (21s) in an ON state as an ON-fixed element. Then, on the basis of the aforementioned voltage commands, the control device 2 performs switching control, by PWM control, for the semiconductor switching elements 21s, 22s (22s, 24s) in the first bridge Leg A of the first converter cell 10A in the first arm 4, and the semiconductor switching elements 41s, 42s (51s, 52s) in the first bridge Leg Aa of the second converter cell 15A (15B) in the second arm 5 (step S2).

Next, current flowing through the DC terminal P is detected by the current detector 11 (step S3).

Next, a short-circuit determination unit of the control device 2 determines whether or not short-circuit has occurred between the DC terminals P, N, on the basis of the detected current value (step S4). When the detected current value is equal to or greater than a predetermined value, the short-circuit determination unit determines that short-circuit has occurred between the DC terminals P, N (including the case where merely overcurrent has occurred).

If the short-circuit determination unit of the control device 2 detects short-circuit between the DC terminals P, N (Yes in step S4), the control device 2 starts operation in the protection mode. In the protection mode, the control device 2 turns off all the semiconductor switching elements 21s to 24s in each first converter cell 10 of the first arm 4 of each leg circuit 3, and turns off all the semiconductor switching elements 41s, 42s (51s, 52s) in each second converter cell 15A (15B) of the second arm 5 of each leg circuit 3 (step S5).

After operation in the protection mode is started, a restart for stating again operation of performing power transmission between the AC terminals U, V, W and the DC terminals P, N is awaited (step S6).

In step S4, if the short-circuit determination unit of the control device 2 does not detect short-circuit between the DC terminals P, N, the process returns to step S3, to periodically and repeatedly perform current detection (step S3) and short-circuit determination (step S4).

Hereinafter, effects of the protection mode will be described with reference to the drawings.

Figure 7:
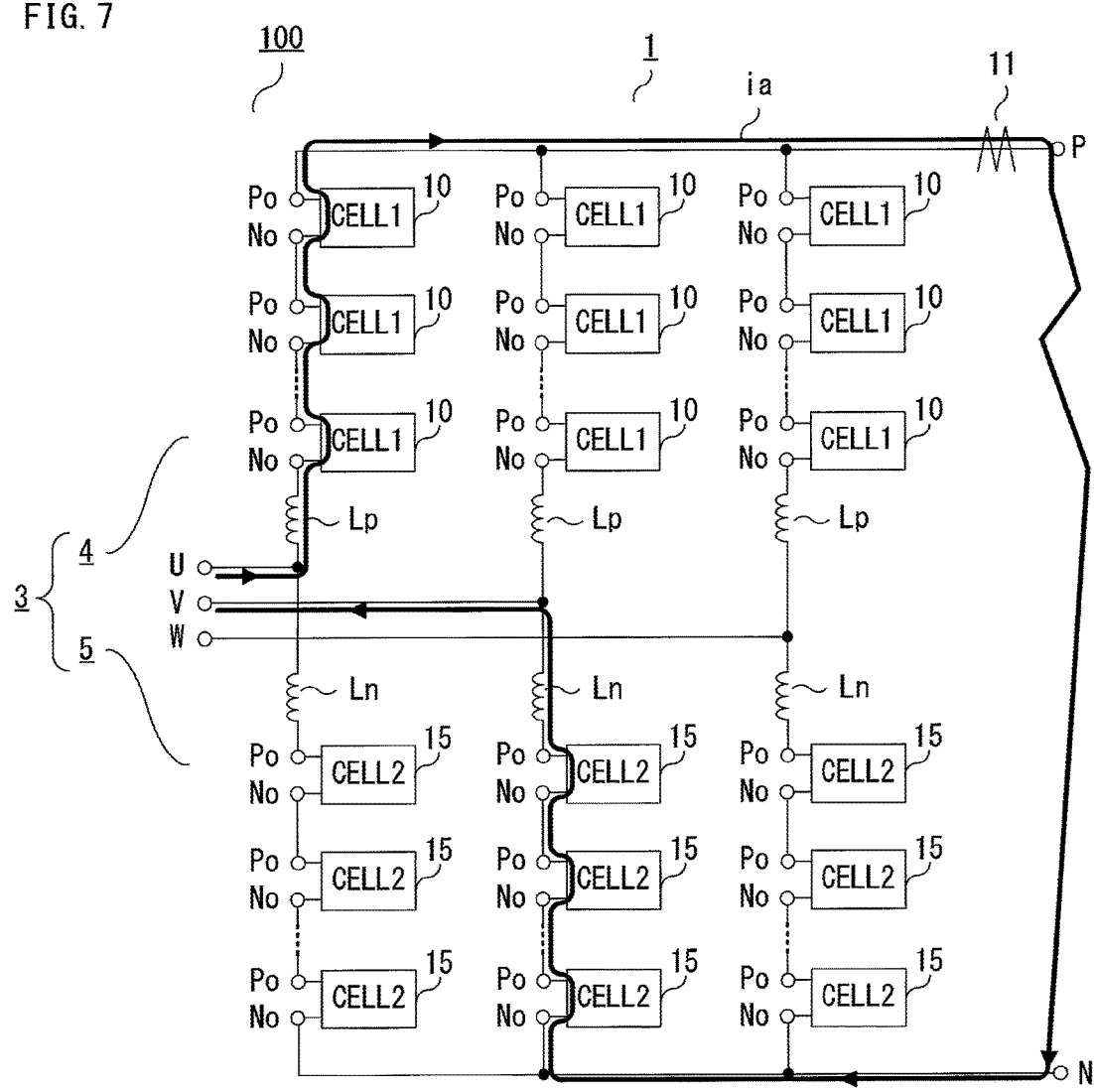
FIG. 7 is a diagram showing a route of short-circuit current in a power converter 1 according to embodiment 1 of the present invention.

FIG. 7 is a diagram showing a route of short-circuit current ia when the DC terminals P, N are short-circuited, in the power converter 1 according to embodiment 1 of the present invention.

Figure 8:
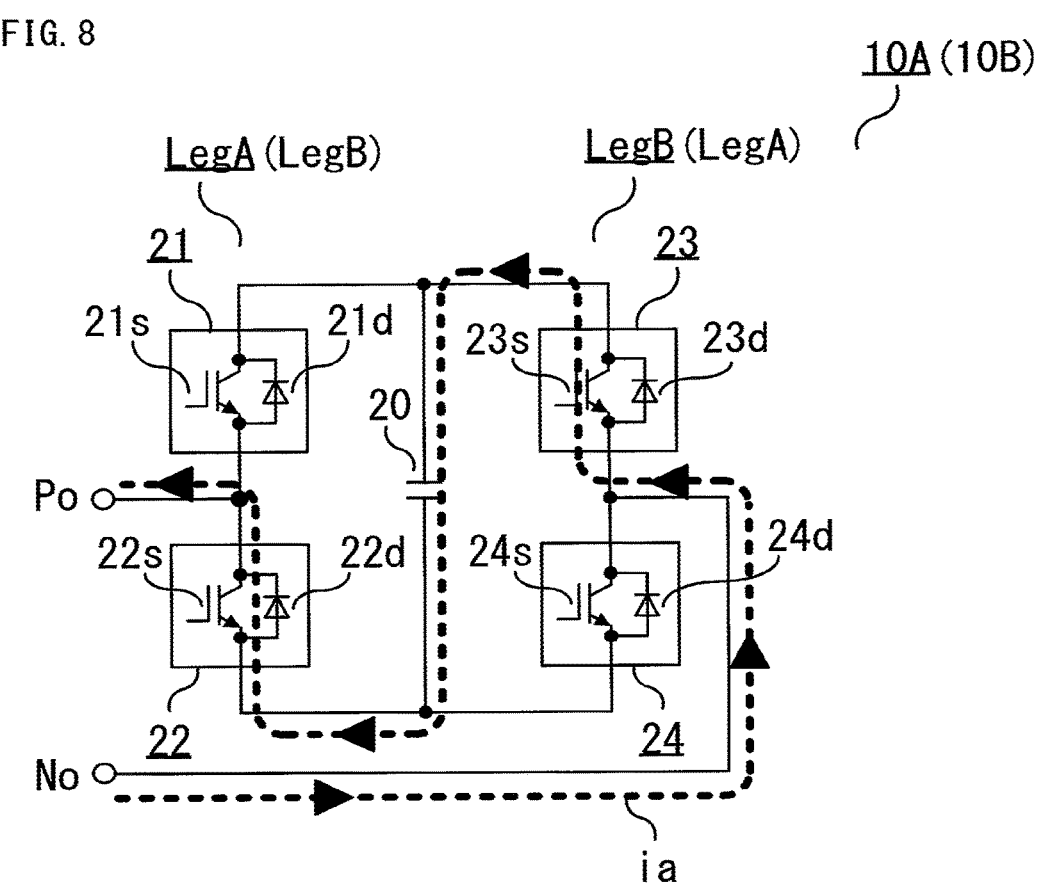
FIG. 8 is a diagram showing a route of short-circuit current in the first converter cell according to embodiment 1 of the present invention.

FIG. 8 is a diagram showing a route of short-circuit current ia when the DC terminals P, N are short-circuited, in the first converter cell 10A (10B) according to embodiment 1 of the present invention.

FIG. 9 is a diagram showing a route of short-circuit current ia when the DC terminals P, N are short-circuited, in the second converter cells 15A, 15B according to embodiment 1 of the present invention.

As shown in FIG. 7, FIG. 8, and FIG. 9, when short-circuit occurs between the DC terminals P, N, short-circuit current ia flows through routes as shown by arrows in the drawings.

As shown in FIG. 8, in the first converter cell 10 having a full-bridge configuration, when short-circuit between the DC terminals P, N occurs, the semiconductor switching elements 21s to 24s are all turned off and thus a short-circuit current route as in a diode rectifier arises. In this case, unless voltage between the output terminals No, Po of the first converter cell 10 exceeds voltage of the capacitor 20, the flyback diodes 23d, 22d do not conduct current and short-circuit current ia does not flow.

Since the output terminals Po, No of the first converter cells 10 are connected in series, in the power converter 1 on the whole, if a sum of voltages of the capacitors 20 of the first converter cells 10 in the first arm 4 connected in the short-circuit current route is higher than voltage between the AC terminals, short-circuit current ia does not flow.

That is, if the first arm 4 includes more first converter cells 10 than the number of converter cells calculated by "maximum value of voltages between AC terminals"/"voltage of capacitor 20 of each converter cell 10", short-circuit current ia does not flow.

It is noted that voltage of the capacitor 20 as used herein is not a rated usage voltage on a product catalog, but charge voltage (usage voltage) of the capacitor 20 when the electric power conversion device 100 is actually used.

As shown in FIG. 9, in the second converter cell 15A (15B) having a half-bridge configuration, when short-circuit between the DC terminals P, N occurs, the semiconductor switching elements 41s, 42s (51s, 52s) are turned off, but a current route passing through the flyback diode 42d (51d) exists. Therefore, supposing that short-circuit current ia flows, the short-circuit current ia flows from the output terminal No via the flyback diode 42d (51d) to the output terminal Po.

In this case, the turning off of the semiconductor switching elements of the second converter cell 15A (15B) is performed for the purpose of reducing influence of switching operation on the AC terminals U, V, W, but does not contribute to suppression of the short-circuit current ia.

It is noted that, in the electric power conversion device 100 of the present embodiment, for the purpose of maintaining operation of the power converter 1 during steady operation in a normal state, a sum of voltages of the capacitors 20 is set to be higher than voltage between the AC terminals (for example, in the case of being connected to grid voltage, the grid voltage). Therefore, during operation in the protection mode, if the semiconductor switching elements 21s to 24s of the first converter cell 10 are all turned off, the short-circuit current ia does not flow in principle. Even if the short-circuit current ia should flow, the capacitors 20 act to suppress the current, and thus the short-circuit current ia is suppressed to be slight.

In the electric power conversion device 100 of the present embodiment configured as described above, the power converter 1 is arranged between the DC terminals P, N and the AC terminals U, V, N, and includes the first arms 4 connected to the positive DC terminal P, and the second arms 5 connected to the negative DC terminal N, thereby enabling large-capacity power conversion between DC and AC. In each leg circuit 3 of the power converter 1, the first converter cells 10 having a full-bridge configuration are used in the first arm 4, and the second converter cells 15 having a half-bridge configuration are used in the second arm 5. Therefore, when short-circuit occurs between the DC terminals P, N, it is possible to suppress short-circuit current ia by turning off all the semiconductor switching elements 21s to 24s of each first converter cell 10 in the first arm 4. Thus, deterioration of elements in the electric power conversion device 100 due to short-circuit current ia can be prevented and energy saving can be achieved while the durability of the electric power conversion device 100 is improved. As described above, as the converter cells composing each second arm 5, the second converter cells 15A, 15B having a half-bridge configuration are used without using converter cells having a full-bridge configuration. Therefore, the number of semiconductor switching elements to be used is decreased, whereby the device size is reduced and cost reduction can be achieved.

Thus, it is possible to prevent deterioration of the semiconductor switching elements and decrease the number of the semiconductor switching elements to be used. Therefore, the failure rate of the semiconductor switching elements is decreased, and reliability of the electric power conversion device 100 can be improved.

Further, during steady operation of the electric power conversion device, one of the semiconductor switching elements in the second bridge Leg B is controlled as an ON-fixed element, and the other one is controlled as an OFF-fixed element, and thus both elements do not perform switching operation. Therefore, the control circuit in the control device 2 can be simplified. Thus, the electric power conversion device 100 can be further downsized.

In the OFF-fixed element (semiconductor switching element 23s (22s)) which is fixed in an OFF state in the second bridge Leg B during steady operation of the electric power conversion device 100, current flows only during a short time in the protection mode. Therefore, it is possible to set a rated current of the OFF-fixed element to be smaller than rated currents of the other semiconductor switching elements (ON-fixed element, and semiconductor switching element in first bridge Leg A (Leg Aa)) through which current flows regularly, and the flyback diodes connected in antiparallel thereto.

As a method for reducing the rated current, for example, the chip area of the semiconductor element may be reduced.

In the above description, the case where the first arm 4 composed of the first converter cells 10 having a full-bridge configuration is connected to the positive DC terminal P, and the second arm 5 composed of the second converter cells 15 having a half-bridge configuration is connected to the negative DC terminal N, has been shown as an example. However, this configuration may be reversed. That is, the first arm 4 composed of the first converter cells 10 having a full-bridge configuration may be connected to the negative DC terminal N, and the second arm 5 composed of the second converter cells 15 having a half-bridge configuration may be connected to the positive DC terminal P.

Thus, it is sufficient that one of the positive and negative arms in each leg circuit 3 is composed of the first converter cells 10 having a full-bridge configuration, and the other one is composed of the second converter cells 15 having a half-bridge configuration.

The configuration for the positive-side reactor Lp and the negative-side reactor Ln and the configuration for the current detector 11 are not limited to those shown in FIG. 1.

In FIG. 1, the current detector 11 is provided on the positive DC terminal P side. However, the current detector 11 may be provided on the negative DC terminal N side.

The current detector 11 may be configured to be at least capable of directly or indirectly detect current flowing through the semiconductor switching elements in the power converter 1, in order to detect short-circuit between the DC terminals P, N.

Hereinafter, other circuit configuration examples of the power converter according to the present embodiment will be described with reference to the drawings.

Figure 10:
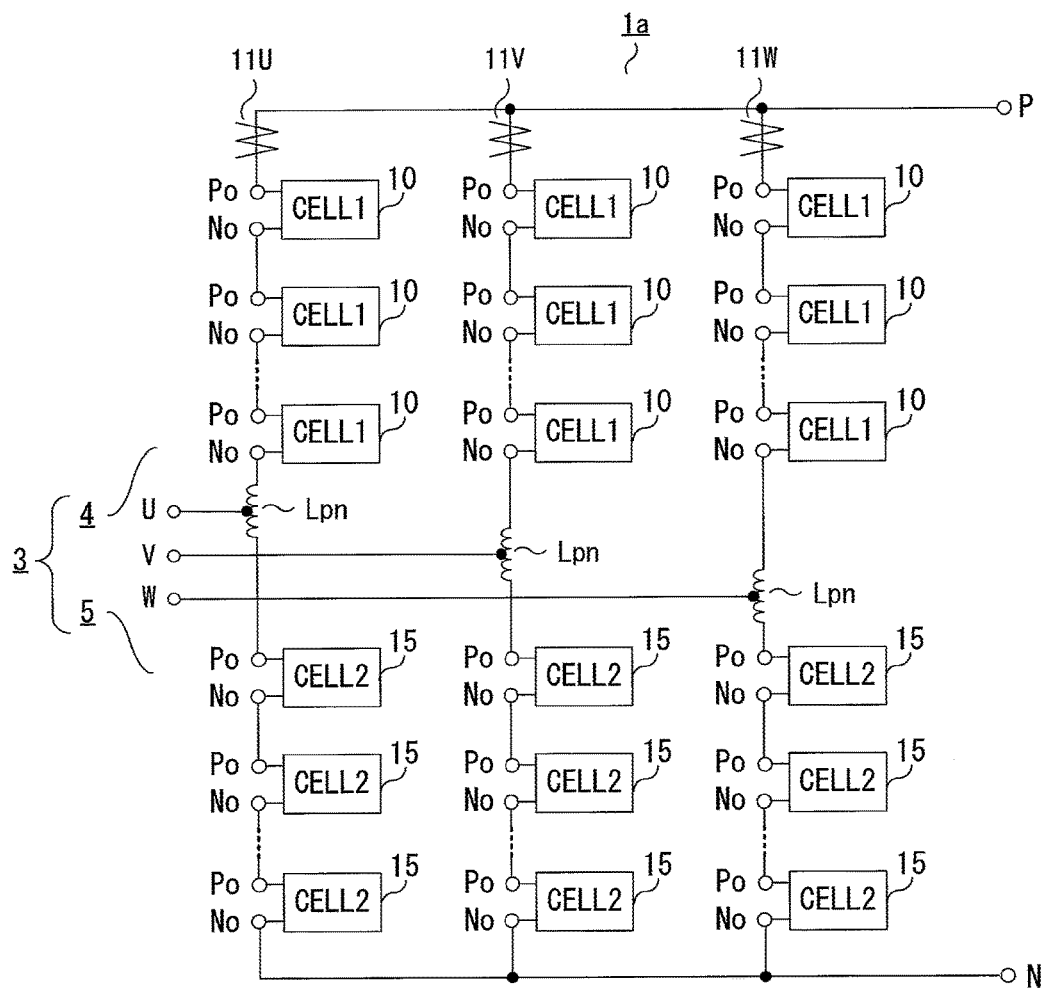
FIG. 10 is a diagram showing a circuit configuration example of the power converter according to embodiment 1 of the present invention.
Figure 11:
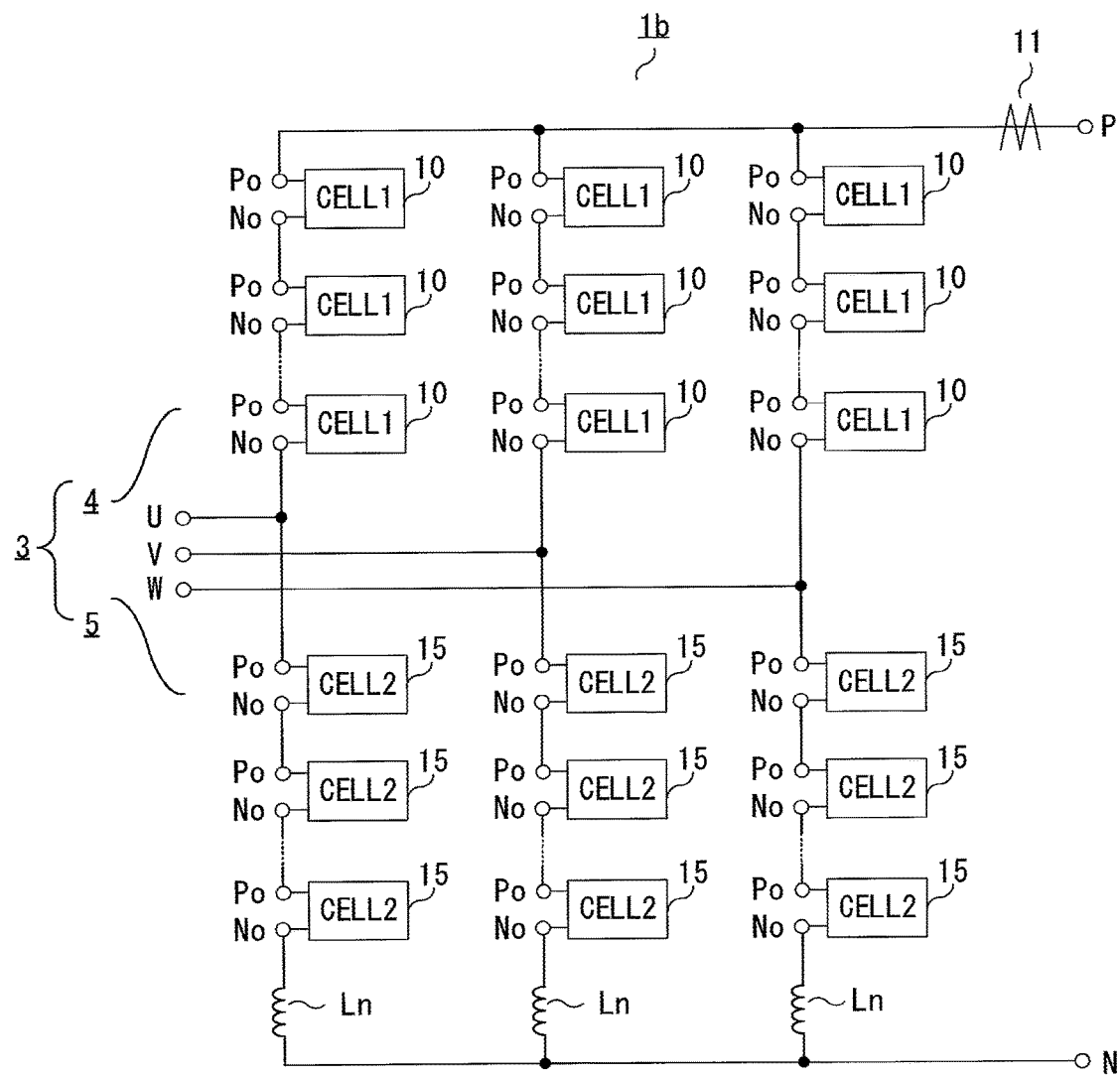
FIG. 11 is a diagram showing a circuit configuration example of the power converter according to embodiment 1 of the present invention.
Figure 12:
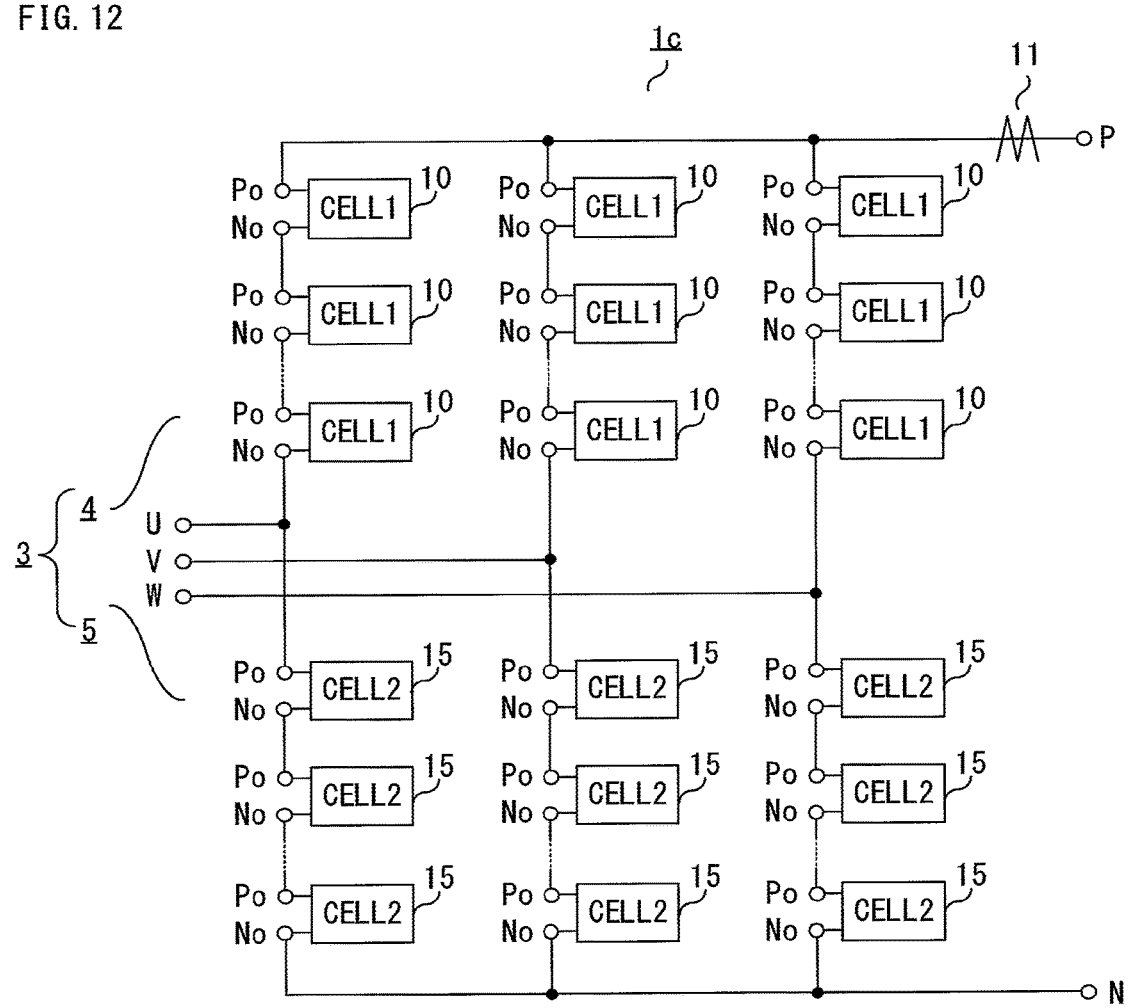
FIG. 12 is a diagram showing a circuit configuration example of the power converter according to embodiment 1 of the present invention.

FIG. 10 to FIG. 12 are diagrams showing circuit configuration examples of the power converter according to embodiment 1 of the present invention.

In a power converter 1a shown in FIG. 10, three-terminal reactors Lpn each obtained by coupling a positive-side reactor and a negative-side reactor are connected on the AC end sides. In addition, current detectors 11U, 11V, 11W are provided on the positive sides of the positive-side arms (in this case, first arms 4) for respective phases.

In a power converter 1b shown in FIG. 11, only the negative-side reactor Ln is connected to the negative-side arm (in this case, second arm 5) for each phase. It is also possible that only the positive-side reactor Lp is connected to the positive-side arm for each phase.

As the positive-side reactor Lp and the negative-side reactor Ln, inductance components may be provided, and for example, an inductance of a wire such as a cable may be used. In a power converter 1c shown in FIG. 12, an inductance of a wire is used instead of connecting a reactor.

Embodiment 2

Hereinafter, with reference to the drawings, embodiment 2 of the present invention will be described focusing on part different from the above embodiment 1. The same components as in the above embodiment 1 are denoted by the same reference characters, and the description thereof is omitted.

Figure 13:
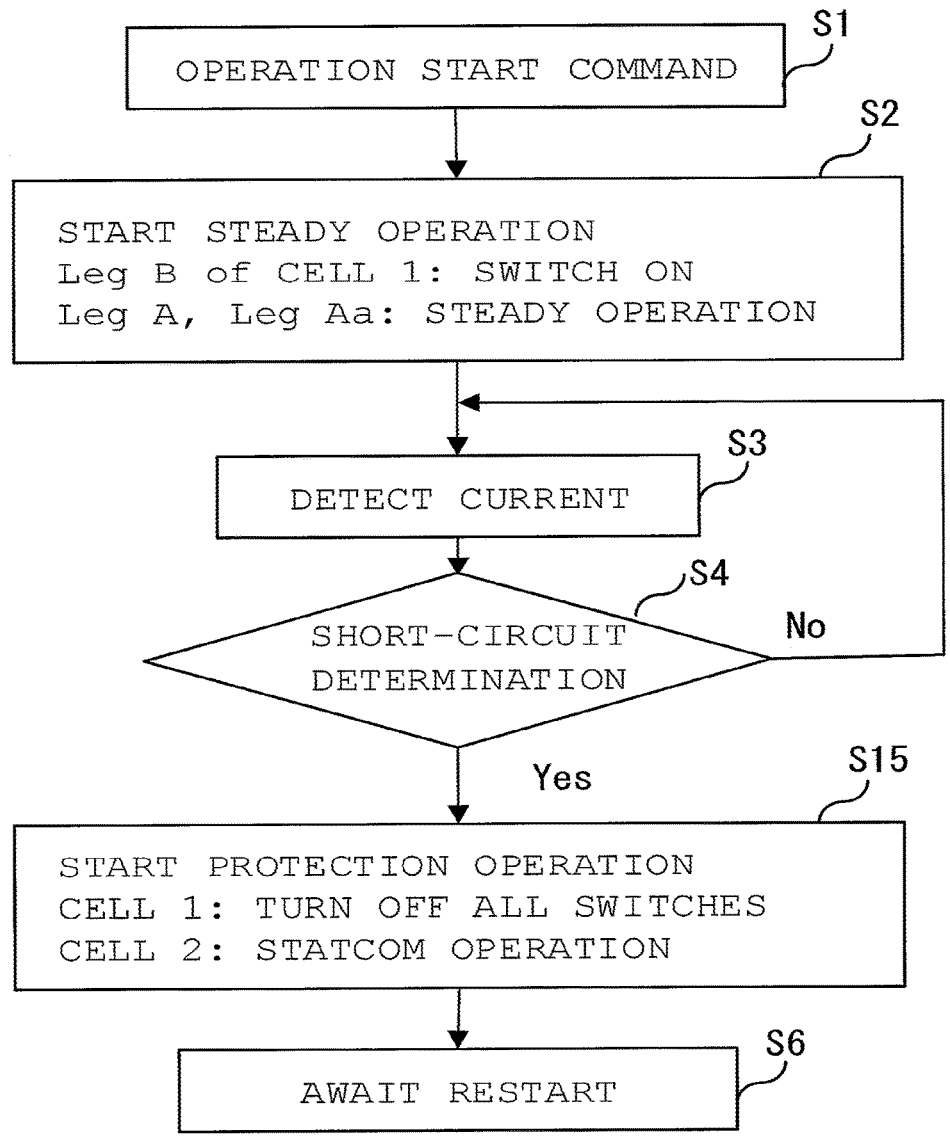
FIG. 13 is a flowchart showing control operation of an electric power conversion device according to embodiment 2 of the present invention.

FIG. 13 is a flowchart showing control operation of an electric power conversion device according to embodiment 2 of the present invention.

Hereinafter, control operation of the electric power conversion device according to embodiment 2 of the present invention will be described.

The control operation from step S1 to step S4 described in embodiment 1 applies also to the present embodiment, and the description thereof is omitted.

The present embodiment is different from embodiment 1 in that reactive power can be outputted to the AC terminal U, V, W side even when the DC terminals P, N are short-circuited.

Hereinafter, operation in the protection mode when the DC terminals P, N are short-circuited will be described.

When a short-circuit determination unit of the control device 2 detects short-circuit between the DC terminals P, N in step S4, the control device 2 starts operation in the protection mode. In the protection mode, the control device 2 turns off all the semiconductor switching elements 21s to 24s in each first converter cell 10 of the first arm 4 of each leg circuit 3, and performs output control of each second converter cell 15 of the second arm 5 so as to perform reactive power compensation operation (step S15).

After operation in the protection mode is started, a restart for starting again operation of performing power transmission between the AC terminals U, V, W and the DC terminals P, N is awaited (step S6).

As described above, the control device 2 causes the second converter cells 15 in the second arm 5 to operate as a STATCOM (Static Synchronous Compensator). When all the semiconductor switching elements 21s to 24s in each first converter cell 10 are turned off, the second converter cells 15 for three phases of the second arms 5 have the same configuration as a modular multilevel converter of star-connection type. In this case, the following control is performed using the control method described in Non-Patent Document 2, for example.

The control device 2 calculates voltage commands so as to generate reactive power having desired AC voltage to the AC terminals U, V, W while controlling capacitor voltage of each second converter cell 15. Then, the semiconductor switching elements in each second converter cell 15 are subjected to switching control by PWM control on the basis of the calculated voltage commands, whereby each second converter cell 15 of the second arms 5 performs reactive power compensation operation.

Here, the second converter cell 15 has a half-bridge configuration and therefore the second converter cell 15 can output only positive voltage. Therefore, the control device 2 controls the reactive power compensation operation using voltage commands on which common DC voltage is superimposed among all phases U, V, W. Thus, the DC voltage component is superimposed on output of each second converter cell 15, and it becomes possible to output AC voltage from the second converter cells 15. Although zero-phase voltage occurs due to the superimposed DC voltage, this does not influence on the AC voltage.

As described above, by using the technique described in Non-Patent Document 2 and adding control of superimposing a DC voltage component on output of each second converter cell 15, it becomes possible to cause the second converter cells 15 in the second arms 5 to operate as a STATCOM.

In the electric power conversion device of the present embodiment configured as described above, the same effect as in the above embodiment 1 is provided, and when the DC terminals P, N are short-circuited, all the semiconductor switching elements 21s to 24s of each first converter cell 10A in the first arms 4 are turned off. Thus, short-circuit current ia can be suppressed. Therefore, deterioration of elements in the electric power conversion device due to short-circuit current ia can be prevented, and energy saving can be achieved while the durability of the electric power conversion device is improved. In addition, the number of semiconductor switching elements to be used is decreased, whereby the device size is reduced and cost reduction can be achieved. Therefore, the failure rate of the semiconductor switching elements is decreased, and reliability of the electric power conversion device can be improved.

Further, when the DC terminals P, N are short-circuited, the second converter cells 15 in the second arms 5 are caused to operate as a STATCOM. Therefore, it is possible to continuously output reactive power to the AC terminals U, V, W even when short-circuit occurs, and thus performance of the electric power conversion device can be enhanced.

It is noted that, in step S15, control of turning off all the semiconductor switching elements 21s to 24s in each first converter cell 10 in the first arms 4, and control of performing output control of each second converter cell 15 of the second arms 5 so as to perform reactive power compensation operation, may be performed at the same time, or either control may be performed first.

Embodiment 3

Hereinafter, with reference to the drawings, embodiment 3 of the present invention will be described focusing on part different from the above embodiments 1, 2. The description of the same part as in the above embodiments 1, 2 is omitted.

Figure 14:
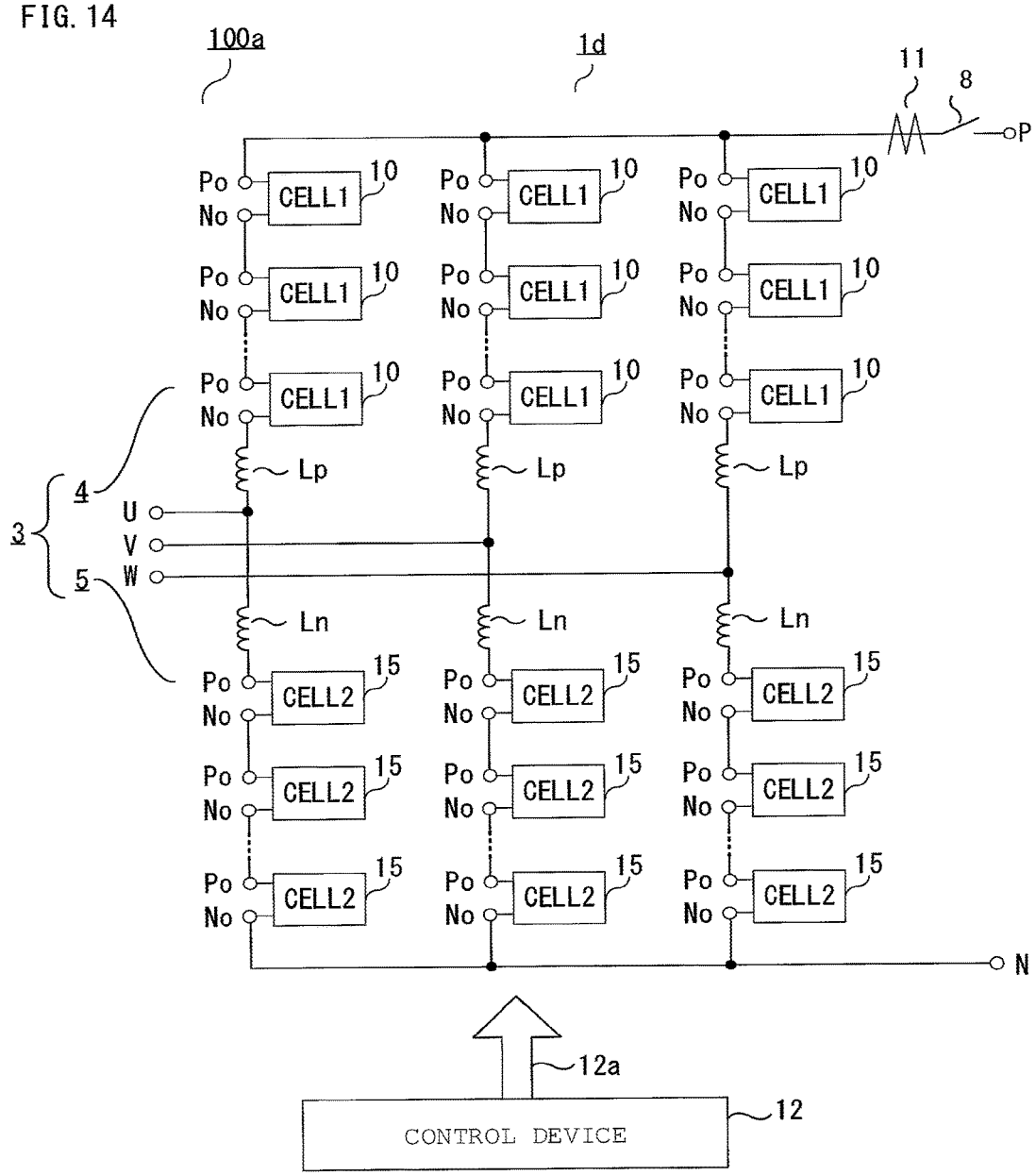
FIG. 14 is a schematic configuration diagram showing an electric power conversion device according to embodiment 3 of the present invention.

FIG. 14 is a schematic configuration diagram of an electric power conversion device 100a according to embodiment 3 of the present invention.

In the present embodiment, an open/close device 8 as an open/close portion is connected on the DC terminal P side of a power converter 1d. It is noted that the open/close device 8 may be included in the electric power conversion device 100a, or may be externally connected without being included in the electric power conversion device 100a itself.

Hereinafter, control operation of the electric power conversion device 100a according to embodiment 3 of the present invention will be described with reference to the drawings.

Figure 15:
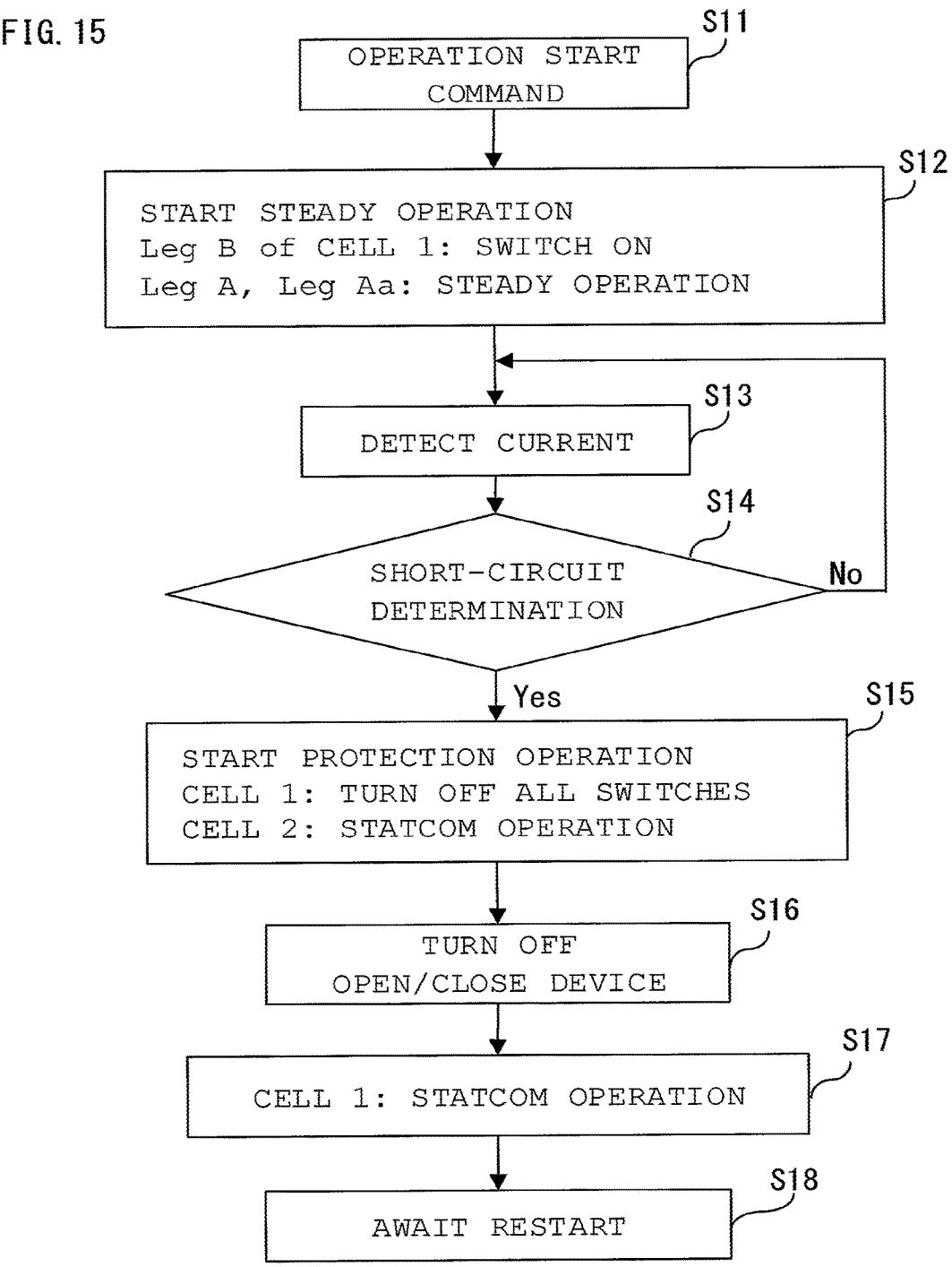
FIG. 15 is a flowchart showing control operation of the electric power conversion device according to embodiment 3 of the present invention.

FIG. 15 is a flowchart showing control operation of the electric power conversion device 100a according to embodiment 3 of the present invention.

The present embodiment is different from embodiment 2 in that, when the DC terminals P, N are short-circuited, not only the second converter cells 15 in the second arms 5 but also the first converter cells 10 in the first arms 4 are caused to operate as a STATCOM, to output reactive power to the AC terminal U, V, W side.

First, when an operation start command is outputted (step S11), the control device 2 operates the open/close device 8 into a closed state, and starts steady operation of the electric power conversion device 100a. Control operation from step S11 to step S15 in the present embodiment is the same as the control operation from step S1 to S15 in embodiment 2. Therefore, the description of step S11 to step S13 is omitted.

As in step 4 of embodiment 2, in step S14 of the present embodiment, when the short-circuit determination unit of a control device 12 detects short-circuit between the DC terminals P, N, the control device 12 starts operation in the protection mode. Then, the control device 12 turns off all the semiconductor switching elements 21s to 24s in each first converter cell 10 of the first arm 4 of each leg circuit 3, and on the basis of a voltage command 12a, performs output control of each second converter cell 15 of the second arm 5 so as to perform reactive power compensation operation (step S15).

Next, the control device 12 operates the open/close device 8 into an opened state (OFF state) (step S16).

Next, on the basis of the voltage command 12a, the control device 12 performs output control of each first converter cell 10 of the first arm 4 so as to perform reactive power compensation operation (step S17).

Next, a restart for starting again operation of performing power transmission between the AC terminals U, V, W and the DC terminals P, N is awaited (step S18).

In the present embodiment, short-circuit between the DC terminals P, N is eliminated by the open/close device 8 being opened. Therefore, it becomes unnecessary to turn off all the semiconductor switching elements 21s to 24s of each first converter cell 10. As a result, it becomes possible to cause the first converter cells 10 to operate as a STATCOM, as in the second converter cells 15.

In the present embodiment, the control device 2 controls reactive power compensation operations of both the second converter cells 15 in the second arms 5 and the first converter cells 10 in the first arms 4, using voltage commands on which common DC voltage is superimposed among all phases U, V, W. Effects by such control will be described below.

In the case where only the second converter cells 15 in the second arms are caused to operate as a STATCOM as described in embodiment 2, zero-phase voltage occurs due to the superimposed DC voltage.

Normally, the zero-phase voltage does not cause a problem. However, in rare cases, a neutral point of three phases is formed by a reactor, a transformer, or the like among the AC terminals U, V, N of the electric power conversion device, and the neutral point is grounded. In this case, zero-phase current corresponding to current to ground can flow due to the zero-phase voltage.

The current to ground can cause an adverse influence such as erroneous operation on another device, and therefore it is necessary to reduce the current to ground as much as possible. In the present embodiment, as described above, a DC voltage component is superimposed on both output of each first converter cell 10 in the first arms 4 and output of each second converter cell 15 in the second arms 5. Therefore, DC zero-phase voltage outputted from the converter cells 10 in each first arm 4 and DC zero-phase voltage outputted from the converter cells 15 in each second arm 5 have polarities opposite to each other and cancel each other, so that current to ground does not flow.

In the electric power conversion device 100a of the present embodiment configured as described above, when the DC terminals P, N are short-circuited, all the semiconductor switching elements 21s to 24s of each first converter cell 10 in the first arms 4 are turned off and thereafter the open/close device 8 is opened. Thus, excessive short-circuit current ia does not flow, the same effects as in the above embodiments 1, 2 are provided, deterioration of elements in the power converter 1 due to short-circuit current ia can be prevented, and energy saving can be achieved while the durability of the electric power conversion device 100a is improved. In addition, the number of semiconductor switching elements to be used is decreased, whereby the device size is reduced and cost reduction can be achieved. Therefore, the failure rate of the semiconductor switching elements is decreased, and reliability of the electric power conversion device 100a can be improved.

Further, by operating the open/close device 8 connected to the DC terminal P into an opened state, it becomes possible to cause the first converter cells 10 in the first arms 4 and the second converter cells 15 in the second arms 5 to operate as a STATCOM, even when short-circuit between the DC terminals P, N occurs.

Therefore, it is possible to continuously output reactive power to the AC terminals U, V, W even when short-circuit occurs, and thus performance of the electric power conversion device 100a can be enhanced.

In the present embodiment, the control device 2 causes both the first converter cells 10 and the second converter cells 15 to operate as a STATCOM. In this case, the control device 2 superimposes a DC voltage component on output of each first converter cell 10 and output of each second converter cell 15, whereby their respective zero-phase voltages can be cancelled by each other. Thus, current to ground can be prevented from flowing, and reliability of the electric power conversion device 100a is improved.

After turning off all the semiconductor switching elements 21s to 24s of each first converter cell 10A in the first arms to suppress short-circuit current ia, the control device 12 operates the open/close device 8 into an opened state. Thus, at the time when the open/close device 8 is opened (OFF), the short-circuit current ia has been suppressed, and therefore the open/close device 8 only has to interrupt zero current or extremely small short-circuit current ia. Therefore, it is sufficient that the open/close device 8 has a small current-interruption capability, and for example, the open/close device 8 may be capable of interrupting current smaller than twice the rated DC current of the power converter 1a. The reason why "twice" is mentioned here is that a general electric power conversion device is capable of interrupting current about twice as great as the rated DC current.

It is noted that the open/close portion (open/close device 8) may be a circuit breaker or a disconnector, or a mechanical open/close portion or an open/close portion using a semiconductor element may be used. The open/close device 8 used in the present embodiment refers to the one having a function of separating potentials of two conductors having the same potential, from each other.

In the present embodiment, the open/close device 8 is connected to the positive DC terminal P. However, the open/close device 8 may be connected to the negative DC terminal N, or may be connected to both the positive DC terminal P and the negative DC terminal N.

It is noted that, in step S15, control of turning off all the semiconductor switching elements 21s to 24s in each first converter cell 10A in the first arms 4, and control of performing output control of each second converter cell 15 of the second arms 5 so as to perform reactive power compensation operation, may be performed at the same time, or either control may be performed first.

The control of opening the open/close device 8 in step 16 is performed after the control in step S15, but is not limited thereto. In general, it takes 5 ms to 10 ms until the open/close device 8 is actually opened (turned off). Therefore, when the control in the protection mode is started in step S15, a command for turning off the open/close device 8 may be outputted at the same time.

The second converter cells 15 are continuously caused to operate as a STATCOM. However, the second converter cells 15 may be stopped as necessary, and only after short-circuit between the DC terminals P, N is eliminated, the second converter cells 15 may be caused to operate as a STATCOM.

Embodiment 4

Hereinafter, with reference to the drawings, embodiment 4 of the present invention will be described focusing on part different from the above embodiments 1, 2, 3. The description of the same part as in the above embodiments 1, 2, 3 is omitted.

The present embodiment is different from the other embodiments in that the present embodiment includes a step of causing only the first converter cells 10 in the first arms 4 to operate as a STATCOM when the DC terminals P, N are short-circuited.

Hereinafter, control operation of an electric power conversion device according to embodiment 4 of the present invention will be described with reference to the drawings.

Figure 16:
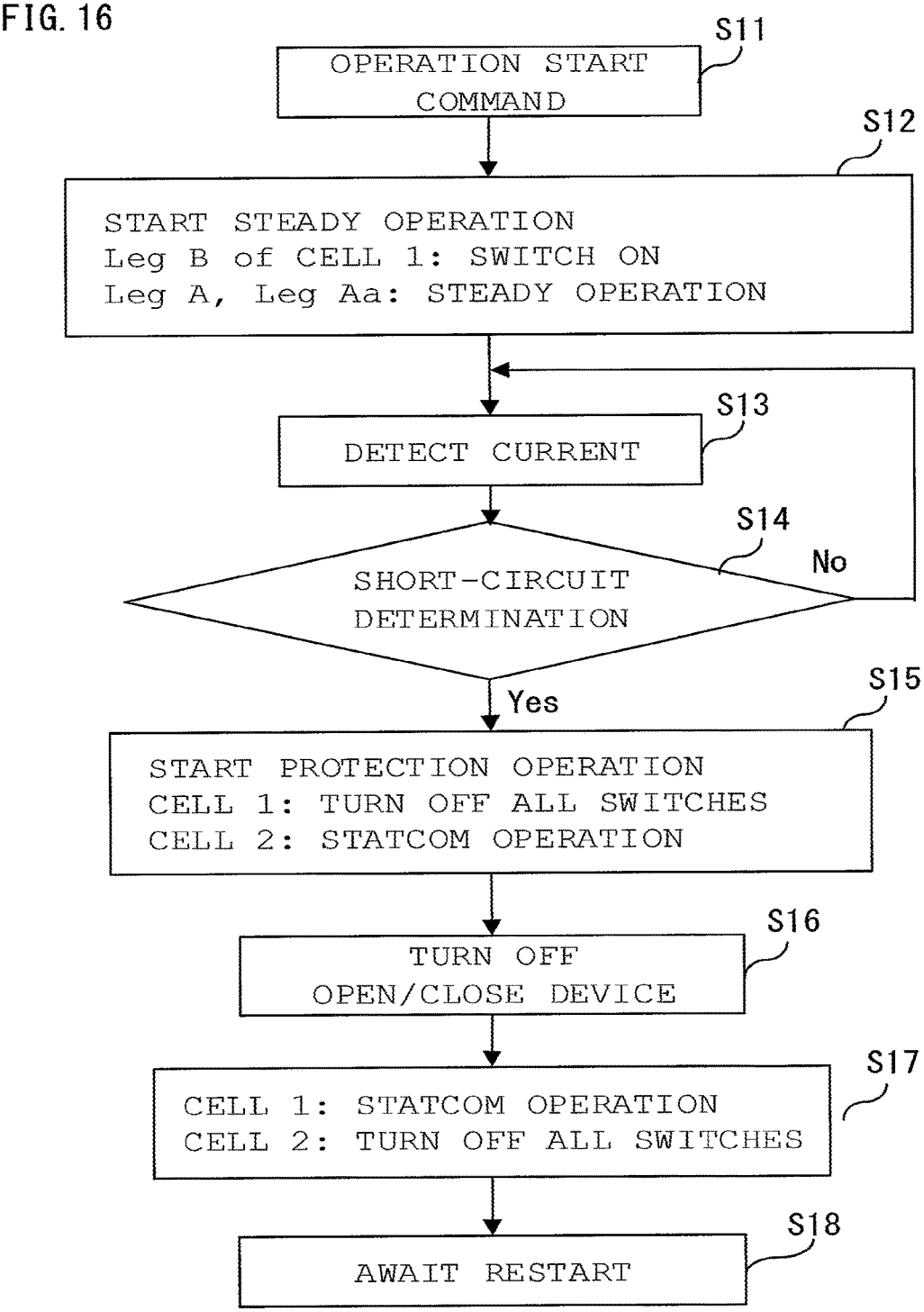
FIG. 16 is a flowchart showing control operation of an electric power conversion device according to embodiment 4 of the present invention.

FIG. 16 is a flowchart showing control operation of the electric power conversion device according to embodiment 4 of the present invention.

Control operation from step S11 to step S16 in the present embodiment is the same as the control operation from step S11 to S16 in embodiment 3. Hereinafter, the description of step S11 to step 14 is omitted.

Also, step S15 and step S16 in the present embodiment are the same as step S15 and step S16 in embodiment 3. When the short-circuit determination unit of the control device 12 detects short-circuit between the DC terminals P, N, the control device 12 turns off all the semiconductor switching elements 21s to 24s in each first converter cell 10 of the first arm 4 of each leg circuit 3, and on the basis of the voltage command 12a, performs output control of each second converter cell 15 of the second arm 5 so as to perform reactive power compensation operation. Then, the short-circuit determination unit of the control device 12 operates the open/close device 8 into an opened state, to turn off the open/close device 8.

Next, the control device 12 turns off all the semiconductor switching elements in each second converter cell 15 of the first arm 4 of each leg circuit 3, and performs output control of each first converter cell 10 of the first arm 4 so as to perform reactive power compensation operation (step S17).

Next, a restart for starting again operation of performing power transmission between the AC terminals U, V, W and the DC terminals P, N is awaited (step S18).

In the present embodiment, only the first converter cells 10 in the first arms 4 are caused to operate as a STATCOM. Since the first converter cells 10 have a full-bridge configuration and output both positive and negative voltages and thus are capable of outputting AC voltage, it is not necessary to superimpose DC voltage as zero-phase voltage on outputs of the first converter cells 10.

In the electric power conversion device of the present embodiment configured as described above, when the DC terminals P, N are short-circuited, all the semiconductor switching elements $21s$ to $24s$ of each first converter cell 10 in the first arms 4 are turned off and thereafter the open/close device 8 is opened. Thus, excessive short-circuit current ia does not flow, the same effects as in the above embodiments 1, 2, 3 are provided, and deterioration of elements in the power converter 1 due to short-circuit current ia can be prevented. Therefore, energy saving can be achieved while the durability of the electric power conversion device is improved. In addition, the number of semiconductor switching elements to be used is decreased, whereby the device size is reduced and cost reduction can be achieved. Therefore, the failure rate of the semiconductor switching elements is decreased, and reliability of the electric power conversion device can be improved.

Further, by operating the open/close device 8 connected to the DC terminal P into an opened state, only the first converter cells 10 in the first arms 4 are caused to operate as a STATCOM in the protection mode. Therefore, even when short-circuit occurs, it is possible to continuously output reactive power to the AC terminals U, V, W without causing zero-phase voltage due to a DC voltage component, and thus performance of the electric power conversion device can be enhanced.

Embodiment 5

Next, an electric power conversion device according to embodiment 5 of the present invention will be described. The electric power conversion device of embodiment 5 is configured by increasing the number of semiconductor switching elements in each of the first bridge Leg A, the second bridge Leg B, and the first bridge Leg Aa of the first converter cell 10 and the second converter cell 15 in embodiment 1, and then connecting the semiconductor switching elements in parallel in each leg, in order to adapt to usage for large current capacity.

The configurations other than the first converter cell 10 and the second converter cell 15 are the same as in the above embodiment 1. In addition, the configurations of the first converter cell 10 and the second converter cell 15 shown in the present embodiment can be applied for the control of the electric power conversion devices 100, 100a described in the above embodiments 1 and 2 in the same manner.

First, two kinds of configurations (first converter cell 10C, first converter cell 10D) of the first converter cell 10 will be described below. It is noted that the first converter cell 100 and the first converter cell 10D have a relationship in which arrangement of the first bridge Leg A and the second bridge Leg B is reversed.

Figure 17:
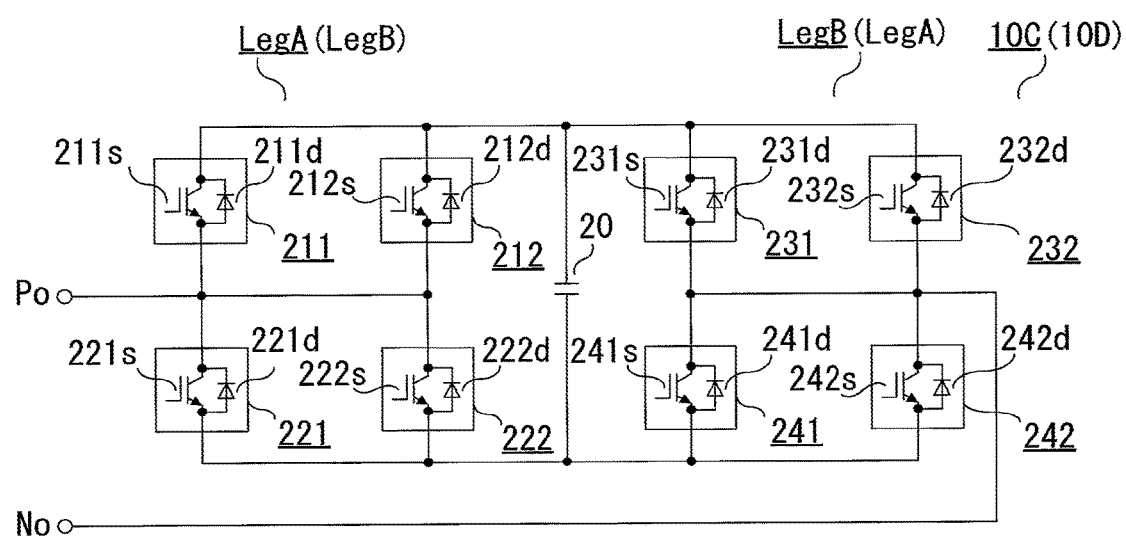
FIG. 17 is a diagram showing a circuit configuration example of a first converter cell according to embodiment 5.

FIG. 17 is a circuit diagram showing the configuration of the first converter cell 100 (10D). The first converter cell 100 (10D) is obtained by connecting two semiconductor elements in parallel in each arm of the first converter cell 10A (10B) shown in FIG. 2.

As shown in FIG. 17, as in the first converter cell 10A (10B), the first converter cell 100 (10D) includes: a Leg A which is a first bridge having upper and lower arms both formed by semiconductor switches; a Leg B which is a second bridge having upper and lower arms both formed by semiconductor switches; and a capacitor 20. The first converter cell 10C (10D) forms a full-bridge circuit in which the first bridge Leg A and the second bridge Leg B are connected in parallel to the capacitor 20.

In the first converter cell 100, a positive output terminal Po is connected to each connection point between the semiconductor switches, which is the middle point in the first bridge Leg A. In addition, a negative output terminal No is connected to each connection point between the semiconductor switches, which is the middle point in the second bridge Leg B.

In the first converter cell 10D, a negative output terminal No is connected to each connection point between the semiconductor switches, which is the middle point in the first bridge Leg A. In addition, a positive output terminal Po is connected to each connection point between the semiconductor switches, which is the middle point in the second bridge Leg B.

In the first converter cell 10C, the upper arm of the first bridge Leg A has semiconductor switches 211, 212 connected in parallel. In addition, the lower arm of the first bridge Leg A has semiconductor switches 221, 222 connected in parallel. The upper arm of the second bridge Leg B has semiconductor switches 231, 232 connected in parallel. In addition, the lower arm of the second bridge Leg B has semiconductor switches 241, 242 connected in parallel.

The semiconductor switches 211, 212, 221, 222, 231, 232, 241, 242 are respectively composed of semiconductor switching elements $211s$, $212s$, $221s$, $222s$, $231s$, $232s$, $241s$, $242s$ and flyback diodes $211d$, $212d$, $221d$, $222d$, $231d$, $232d$, $241d$, $242d$ connected in antiparallel thereto.

In the first converter cell 10D, the upper arm of the second bridge Leg B has the semiconductor switches 211, 212 connected in parallel. In addition, the lower arm of the second bridge Leg B has the semiconductor switches 221, 222 connected in parallel. The upper arm of the first bridge Leg A has the semiconductor switches 231, 232 connected in parallel. The lower arm of the first bridge Leg A has the semiconductor switches 241, 242 connected in parallel.

The control device 2 performs simultaneous ON/OFF control of the semiconductor switching elements connected in parallel. Thus, the control device 2 controls the first converter cell 100 in the same manner as in the first converter cell 10A described in the above embodiment 1, and controls the first converter cell 10D in the same manner as in the first converter cell 10B.

As the semiconductor switching elements in the first converter cell 100 (10D), self-turn-off semiconductor switching elements such as IGBT, GCT, or MOSFET are used. If diodes (body diodes) are included in the semiconductor switching elements, the flyback diodes may be omitted.

As described above, the first converter cell 10C (10D) is configured such that two semiconductor elements are connected in parallel in each arm, and the semiconductor switching elements connected in parallel are simultaneously controlled to be ON/OFF, whereby the current capacity can be increased.

As described in embodiment 1, in the OFF-fixed elements (semiconductor switching elements 231s, 232s (221s, 222s)) used in the second bridge Leg B of the first converter cell 10, current flows only during a comparatively short time in the protection mode. Therefore, in the first converter cell 100 (10D), even if the semiconductor switches 231, 232 (221, 222) connected in parallel in the second bridge Leg B and including the OFF-fixed elements are replaced with one element, increase in heat generation and loss can be almost ignored.

Figure 18:
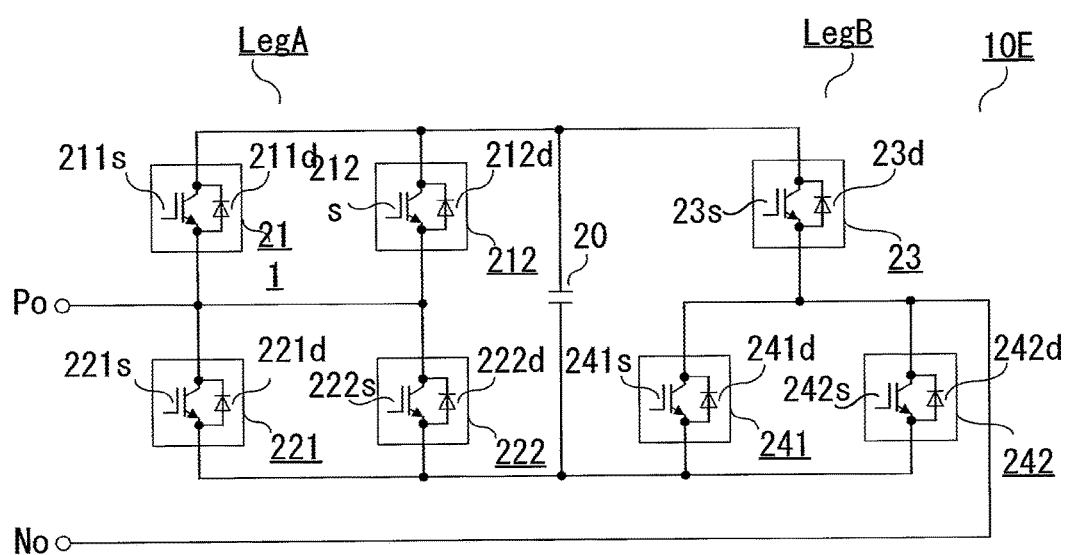
FIG. 18 is a diagram showing a circuit configuration example of the first converter cell according to embodiment 5.
Figure 19:
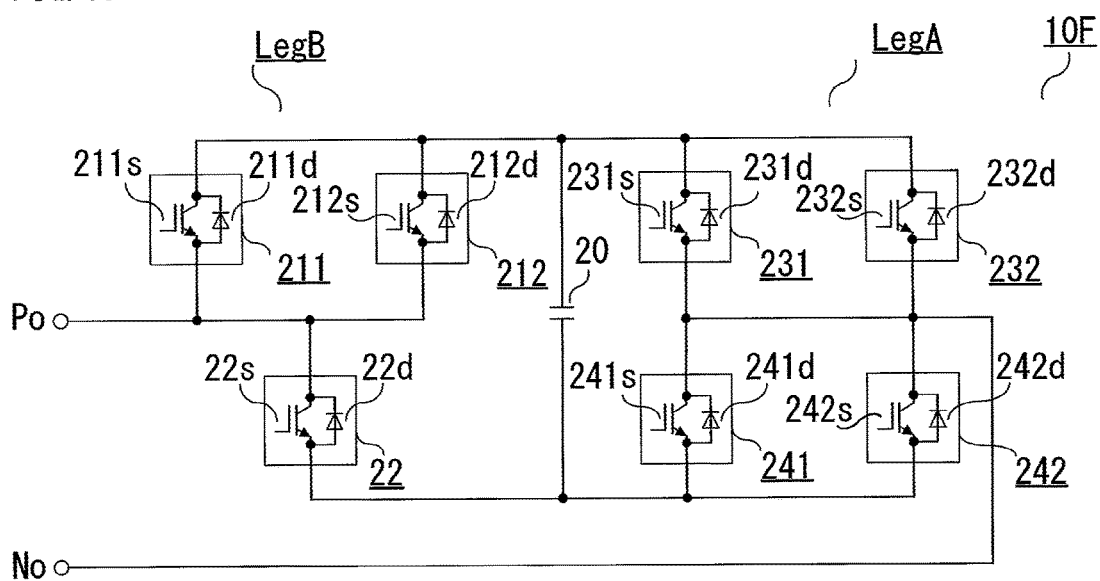
FIG. 19 is a diagram showing a circuit configuration example of the first converter cell according to embodiment 5.

A first converter cell 10E shown in FIG. 18 is obtained by replacing the semiconductor switches 231, 232 connected in parallel in the first converter cell 100 shown in FIG. 17, with one semiconductor switch 23. A first converter cell 10F shown in FIG. 19 is obtained by replacing the semiconductor switches 221, 222 connected in parallel in the first converter cell 10D shown in FIG. 17, with one semiconductor switch 22.

Thus, by using one semiconductor switch 23 (22), the current capacities of the first converter cells 10E, 10F can be increased, and the number of elements therein can be decreased, leading to size reduction.

Further, as described in embodiment 1, in steady operation, the semiconductor switching elements of the second bridge Leg B of the first converter cell 10 are controlled to be fixed in an ON state or OFF state. Therefore, in the first converter cell 10E (10F), switching loss in the semiconductor switching elements in the second bridge Leg B is smaller than that in the semiconductor switching elements in the first bridge Leg A. Therefore, the number of semiconductor switching elements connected in parallel in the second bridge Leg B can be set to be not greater than the number of semiconductor switching elements connected in parallel in the first bridge Leg A. Therefore, in the first converter cell 10E (10F), the semiconductor switches 241, 242 (211, 212) which are connected in parallel and are ON-fixed elements in the second bridge Leg B can be replaced with one element, and thus the number thereof can be set to be not greater than the number of semiconductor switching elements connected in parallel in the first bridge Leg A.

Figure 20:
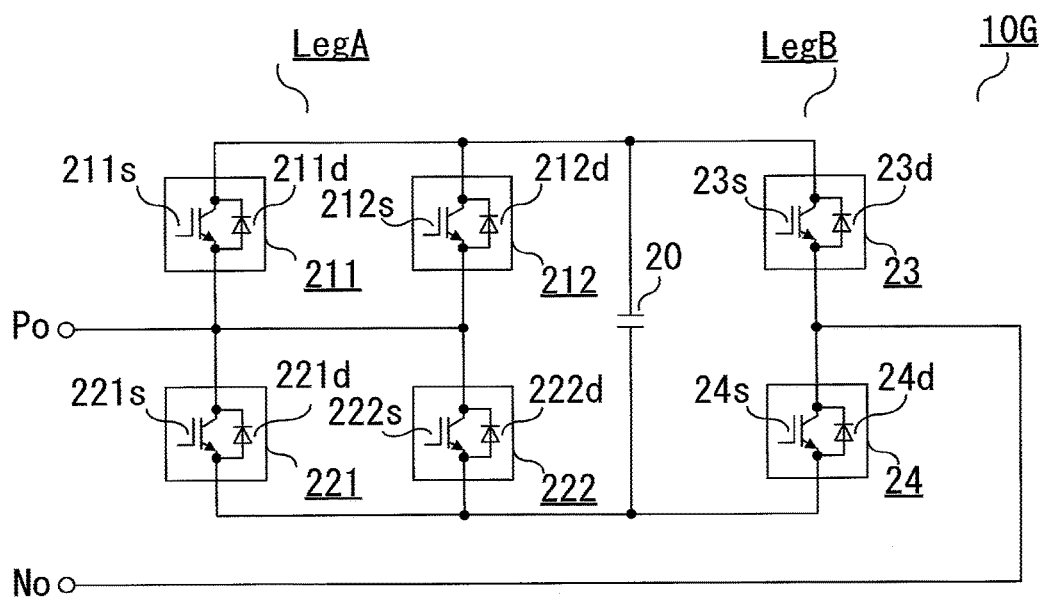
FIG. 20 is a diagram showing a circuit configuration example of the first converter cell according to embodiment 5.
Figure 21:
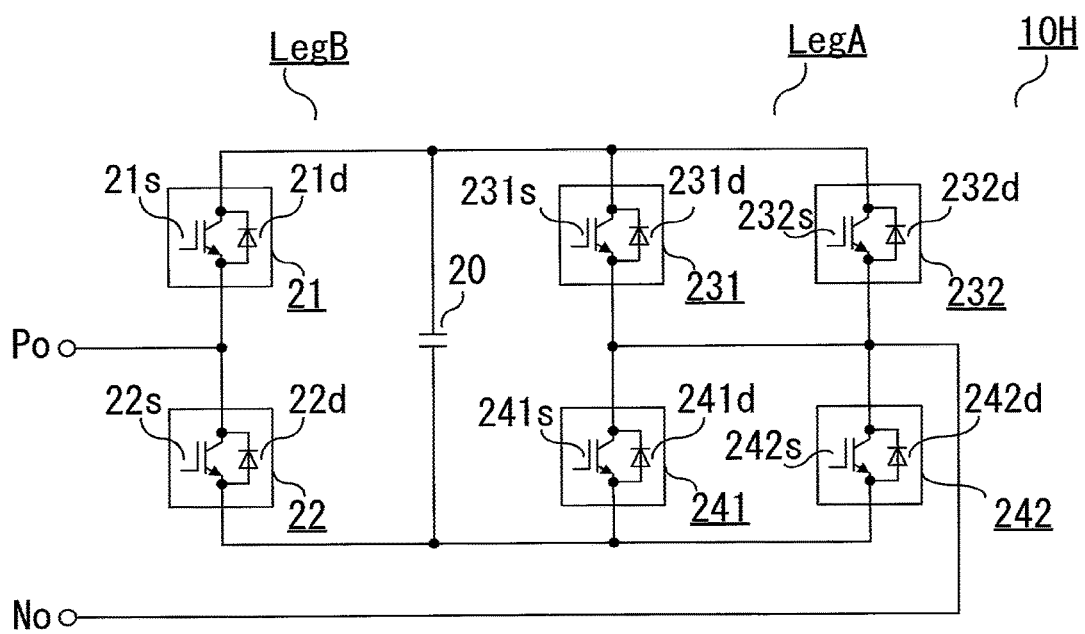
FIG. 21 is a diagram showing a circuit configuration example of the first converter cell according to embodiment 5.

A first converter cell 10G shown in FIG. 20 is obtained by replacing the semiconductor switches 241, 242 which are connected in parallel and are ON-fixed elements in the first converter cell 10E shown in FIG. 18, with one semiconductor switch 24. A first converter cell 10H shown in FIG. 21 is obtained by replacing the semiconductor switches 211, 212 which are connected in parallel and are ON-fixed elements in the first converter cell 10F shown in FIG. 19, with one semiconductor switch 21.

In this case, the first bridge Leg A has a two-element parallel configuration in both of the upper and lower arms, and the second bridge Leg B has a one-element non-parallel configuration in both of the upper and lower arms. Thus, the current capacities of the first converter cells 10G, 10H can be increased, and the number of elements therein can be decreased, leading to size reduction.

Figure 22:
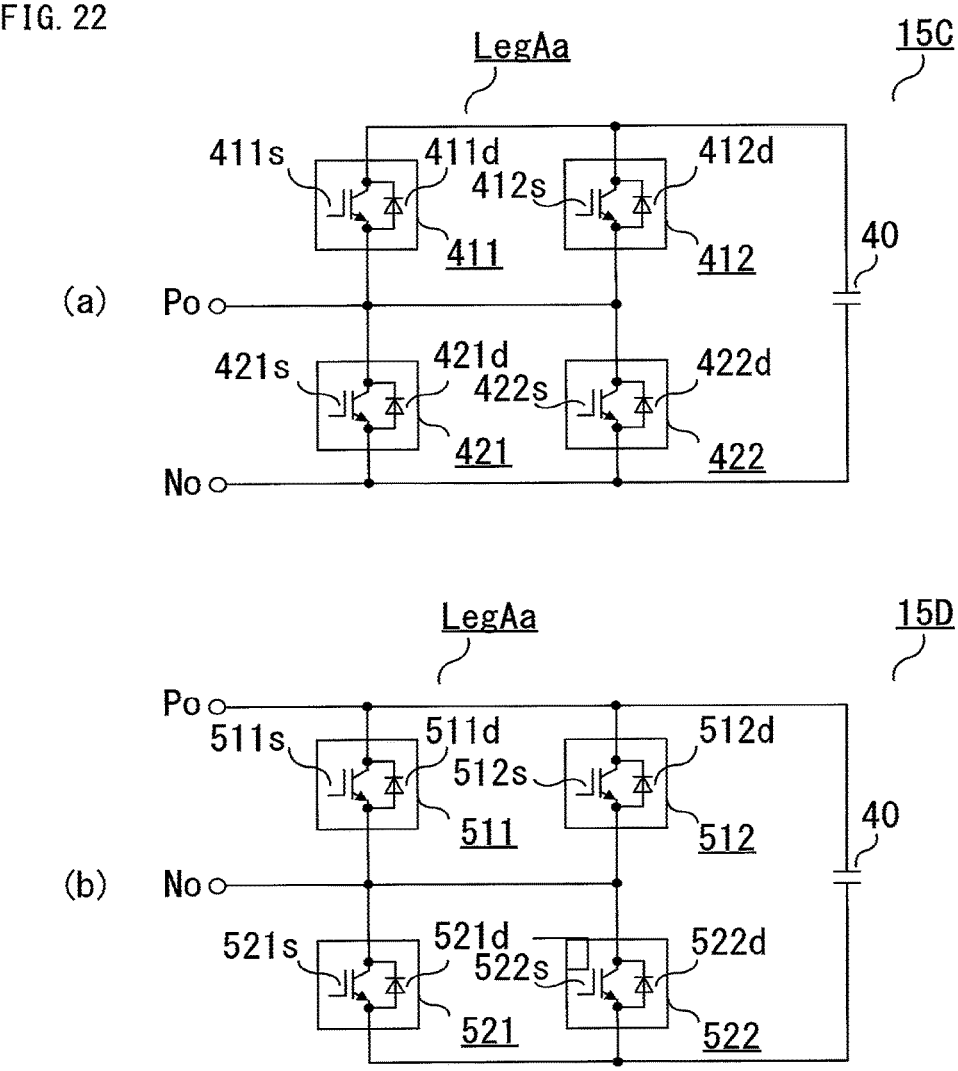
FIG. 22 is a diagram showing a circuit configuration example of a second converter cell according to embodiment 5.

Next, two kinds of configurations (second converter cells 15C, 15D) of the second converter cell 15 will be described below, with reference to FIG. 22.

A second converter cell 15C shown in FIG. 22(a) is obtained by connecting two semiconductor switches in parallel in each arm of the second converter cell 15A shown in FIG. 3(a).

A second converter cell 15D shown in FIG. 22(b) is obtained by connecting two semiconductor switches in parallel in each arm of the second converter cell 15B shown in FIG. 3(b).

As shown in FIG. 22(a), the second converter cell 15C includes: a Leg Aa which is a first bridge having upper and lower arms both formed by semiconductor switches; and a capacitor 40. The second converter cell 15C forms a half-bridge circuit in which the first bridge Leg Aa is connected in parallel to the capacitor 40. A positive output terminal Po is connected to each connection point between the semiconductor switches, which is the middle point in the first bridge Leg Aa. A negative output terminal No is connected to each connection point between the capacitor 40 and the semiconductor switches of the lower arm.

In the second converter cell 15C, the upper arm of the first bridge Leg Aa has semiconductor switches 411, 412 connected in parallel, and the lower arm thereof has semiconductor switches 421, 422 connected in parallel.

As shown in FIG. 22(b), the second converter cell 15D includes: a Leg Aa which is a first bridge having upper and lower arms both formed by semiconductor switches; and a capacitor 40. The second converter cell 15D forms a half-bridge circuit in which the first bridge Leg Aa is connected in parallel to the capacitor 40. A negative output terminal No is connected to each connection point between the semiconductor switches, which is the middle point in the first bridge Leg Aa, and a positive output terminal Po is connected to each connection point between the capacitor 40 and the semiconductor switches of the upper arm.

In the second converter cell 15D, the upper arm of the first bridge Leg Aa has semiconductor switches 511, 512 connected in parallel, and the lower arm thereof has semiconductor switches 521, 522 connected in parallel.

In the second converter cell 15C (15D), the semiconductor switches 411, 412, 421, 422 (511, 512, 521, 522) are respectively composed of semiconductor switching elements 411s, 412s, 421s, 422s (511s, 512s, 521s, 522s) and flyback diodes 411d, 412d, 421d, 422d (511d, 512d, 521d, 522d) connected in antiparallel thereto.

As the semiconductor switching elements in the second converter cells 15C, 15D, self-turn-off semiconductor switching elements such as IGBT, GCT, or MOSFET are used. If diodes (body diodes) are included in the semiconductor switching elements, the flyback diodes may be omitted.

The control device 2 performs simultaneous ON/OFF control of the semiconductor switching elements connected in parallel, thereby controlling the second converter cell 15C (15D) in the same manner as in the second converter cell 15A (15B) shown in the above embodiment 1.

Thus, the second converter cells 15C, 15D are configured such that two semiconductor elements are connected in parallel in each arm, and the semiconductor switching elements connected in parallel are simultaneously controlled to be ON/OFF, whereby the current capacity can be increased.

As described above, in the present embodiment 5, the number of the semiconductor switching elements in each of the first bridge Leg A, the second bridge Leg B, and the first bridge Leg Aa of the first converter cell 10 and the second converter cell 15 is increased, and the semiconductor switching elements in each leg are connected in parallel. Thus, an electric power conversion device adapted to usage for large current capacity can be achieved.

Regarding the parallel connection, the case where two elements are connected in parallel has been shown, but three or more elements may be connected in parallel. Also in this case, the number of OFF-fixed elements connected in parallel in the second bridge Leg B of the first converter cell 10 can be set to be not greater than the number of other semiconductor switching elements connected in parallel in each of the first bridge Leg A and the second bridge Leg B. Thus, the number of ON-fixed elements connected in parallel in the second bridge Leg B of the first converter cell 10 becomes not greater than the number of semiconductor switching elements connected in parallel in each arm of the first bridge Leg A. That is, the number of the parallel connection ON-fixed elements in the second bridge Leg B can be set to be not smaller than the number of parallel connection OFF-fixed elements in the second bridge Leg B, and not greater than the number of the parallel connection semiconductor switching elements in the first bridge Leg A.

By effectively decreasing the number of elements as described above, the electric power conversion device adapted to usage for large current capacity can be efficiently downsized.

Figure 23:
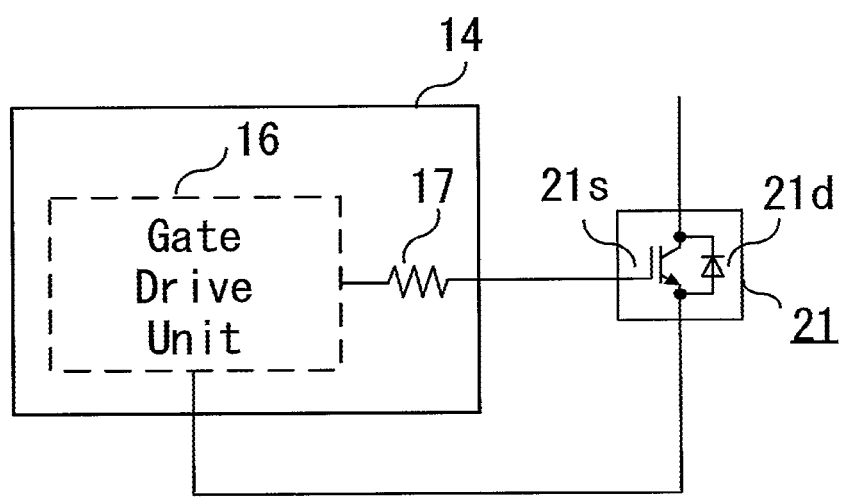
FIG. 23 is a schematic diagram of a circuit configuration of a gate drive circuit applied to each embodiment.

FIG. 23 is a diagram schematically showing a circuit configuration of a gate drive circuit 14 for driving each semiconductor switching element in the power converters 1, 1a to 1d.

In the above embodiments, the gate drive circuit 14 is provided to each semiconductor switching element in the power converters 1, 1a to 1d. As shown in FIG. 23, the gate drive circuit 14 includes a gate resistance 17, and a gate drive unit 16 having a transistor, etc., for turning on and off each semiconductor switching element. Each gate drive circuit 14 drives the semiconductor switching element on the basis of the control signal 2a, 12a from the control device 2, 12. In the gate drive circuit 14 in the second bridge Leg B of the first converter cell 10, the value of the gate resistance 17 can be set to be greater than those in the gate drive circuits 14 in the first bridge Leg A and the first bridge Leg Aa of the first and second converter cells 10, 15.

If the value of the gate resistance 17 of the gate drive circuit 14 becomes greater, the switching speed of the semiconductor switching element is slowed, so that surge voltage when current is interrupted (at the time of turning off) can be suppressed, while switching loss per one switching increases. In the steady mode, each semiconductor switching element in the second bridge Leg B is fixed in an ON state or OFF state and does not perform switching. Therefore, even if the value of the gate resistance 17 is increased, surge voltage can be suppressed without increasing switching loss. Therefore, even if the number of the semiconductor switching elements connected in parallel in the second bridge Leg B of the first converter cell 10 is decreased, a great current-interruption capability can be obtained.

Wide bandgap semiconductors may be used as material for all or some of the semiconductor elements (semiconductor switching elements, diodes) in the first and second converter cells 10, 15. Silicon is often used as material for the semiconductor elements. Examples of materials for wide bandgap semiconductors include silicon carbide, a gallium-nitride-based material, and diamond.

By using wide bandgap semiconductors, the withstand voltage of the semiconductor elements can be enhanced, and therefore the number of the converter cells connected in series can be decreased. Further, wide bandgap semiconductors can reduce switching loss.

Therefore, for example, wide bandgap semiconductors may be used for only the semiconductor switching elements that perform switching operations in a steady state, and the flyback diodes connected in antiparallel thereto.

In addition, by increasing the chip area of a wide bandgap semiconductor, conduction loss can be reduced. Using this, conduction loss can be reduced by using wide bandgap semiconductors for only the semiconductor switching elements that are always turned on in a steady state.

If wide bandgap semiconductors are used for all the semiconductor elements, both of the aforementioned effects can be obtained.

Embodiment 6

Hereinafter, with reference to the drawings, embodiment 6 of the present invention will be described focusing on part different from the above embodiments 1 to 5. The description of the same part as in the above embodiments 1 to 5 is omitted.

Figure 24:
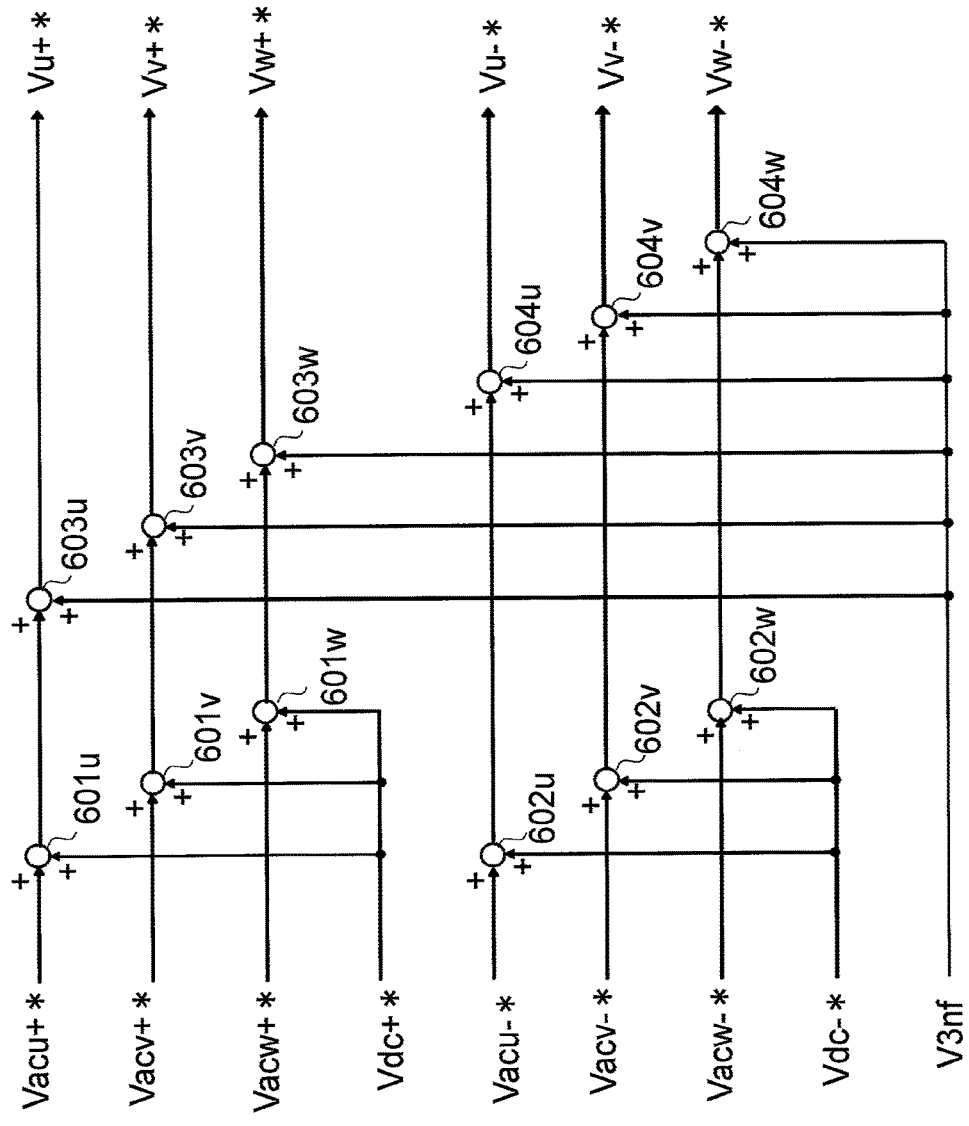
FIG. 24 is a control block diagram of a control device according to embodiment 6.

FIG. 24 is a control block diagram of a control device 2 according to embodiment 6 of the present invention.

The present embodiment is different from the other embodiments in that, for the purpose of improving the voltage usage rate, the control device 2 controls semiconductor switching elements, using voltage commands on which a common AC component is superimposed among all phases U, V, W.

Normally, the semiconductor switching elements in the converter cells of the power converter 1 are controlled on the basis of voltage commands containing DC components and fundamental wave AC components.

In FIG. 24, Vdc+* denotes the DC component of the voltage commands for the semiconductor switching elements in the first arms 4, and Vacu+*, Vacv+*, and Vacw+* denote the fundamental wave AC components thereof. In addition, Vdc−* denotes the DC component of the voltage commands for the semiconductor switching elements in the second arms 5, and Vacu−*, Vacv−*, and Vacw−* denote the fundamental wave AC components thereof.

In the present embodiment, a common AC component (V3nf) among all phases U, V, W is superimposed on the fundamental wave AC components (Vacu+*, Vacv+*, Vacw+*, Vacu−*, Vacv−*, Vacw−*). Further, the DC components (Vdc+*, Vdc−*) are added thereto, thereby generating voltage commands (Vu+*, Vv+*, Vw+*, Vu−*, Vv−*, Vw−*), and on the basis of these voltage commands, the semiconductor switching elements are subjected to switching control by PWM control.

In the present embodiment, as the common AC component (V3nf) among all phases U, V, W, a third-order harmonic having a frequency three times as high as that of the fundamental wave is used.

Hereinafter, effects obtained when the semiconductor switching elements are controlled using the voltage commands (Vu+*, Vv+*, Vw+*, Vu−*, Vv−*) on which the common AC component (V3nf) is superimposed among all phases U, V, W, will be described, as compared to the case where the AC component (V3nf) is not superimposed.

In the case of using voltage commands on which the AC component (V3nf) is not superimposed, each voltage command can become greater than a carrier wave in the vicinity of the maximum value of the voltage command, and each voltage command can become smaller than a carrier wave in the vicinity of the minimum value of the voltage command. In this case, each semiconductor switching element does not operate to be ON or OFF and thus overmodulation occurs, and this can cause increase in harmonic components of the output voltage or hinder a desired operation.

The AC voltage component (V3nf) having the same initial phase as the fundamental wave and having a frequency three times as high as that of the fundamental wave, has a polarity opposite to the fundamental wave in the vicinity of the maximum value and the minimum value of each fundamental wave AC component (Vacu+*, Vacv+*, Vacw+*, Vacu-*, Vacv-*, Vacw-*). That is, by superimposing the AC voltage component (V3nf) on each fundamental wave AC components (Vacu+*, Vacv+*, Vacw+*, Vacu-*, Vacv-*, Vacw-*), the maximum value of the voltage commands (Vu+*, Vv+*, Vw+*, Vu-*, Vv-*) decreases and the minimum value thereof increases. Thus, a voltage margin before leading to overmodulation can be ensured and the voltage usage rate can be improved.

It is noted that zero-phase voltage occurs due to the superimposed AC voltage but does not influence the AC grid. The superimposed AC voltage component is outputted to the DC grid side, and the frequency and the magnitude thereof are settable.

In the reactive power compensation operation described in embodiments 2, 3, 4, the control device 2 uses voltage commands on which a common DC voltage is superimposed among all phases U, V, W, for the purpose of ensuring the output possible range of the second converter cells 15 having a half-bridge configuration. In this case, the common DC voltage component among all phases U, V, W is caused to be contained in the DC component (Vdc-*) of the voltage commands for the converter cells of the second arms 5. Also in the present embodiment 6, in the case of performing reactive power compensation operation, the common DC voltage component among all phases U, V, W is caused to be contained in the DC component (Vdc-*) of the voltage commands for the converter cells of the second arms 5. Thus, while suppressing overmodulation of the power converter 1, it is possible to ensure the output possible range of the second converter cells 15 having a half-bridge configuration in reactive power compensation operation.

It is noted that, in the present embodiment, the AC voltage component (V3nf) to be superimposed has a frequency three times as high as that of the fundamental wave, but may have a frequency obtained by multiplying the frequency of the fundamental wave by an odd multiple of three. After all, the AC voltage component (V3nf) may have such a frequency that the AC voltage component becomes minimum in the vicinity of the maximum value of the fundamental wave AC component (Vacu+*, Vacv+*, Vacw+*, Vacu-*, Vacv-*, Vacw-*) and becomes maximum in the vicinity of the minimum value of the fundamental wave AC component.

Embodiment 7

Hereinafter, an electric power system using the electric power conversion devices described in the above embodiments 1 to 6 will be described with reference to the drawings. The same components as in the above embodiment 1 are denoted by the same reference characters and the description thereof is omitted.

Figure 25:
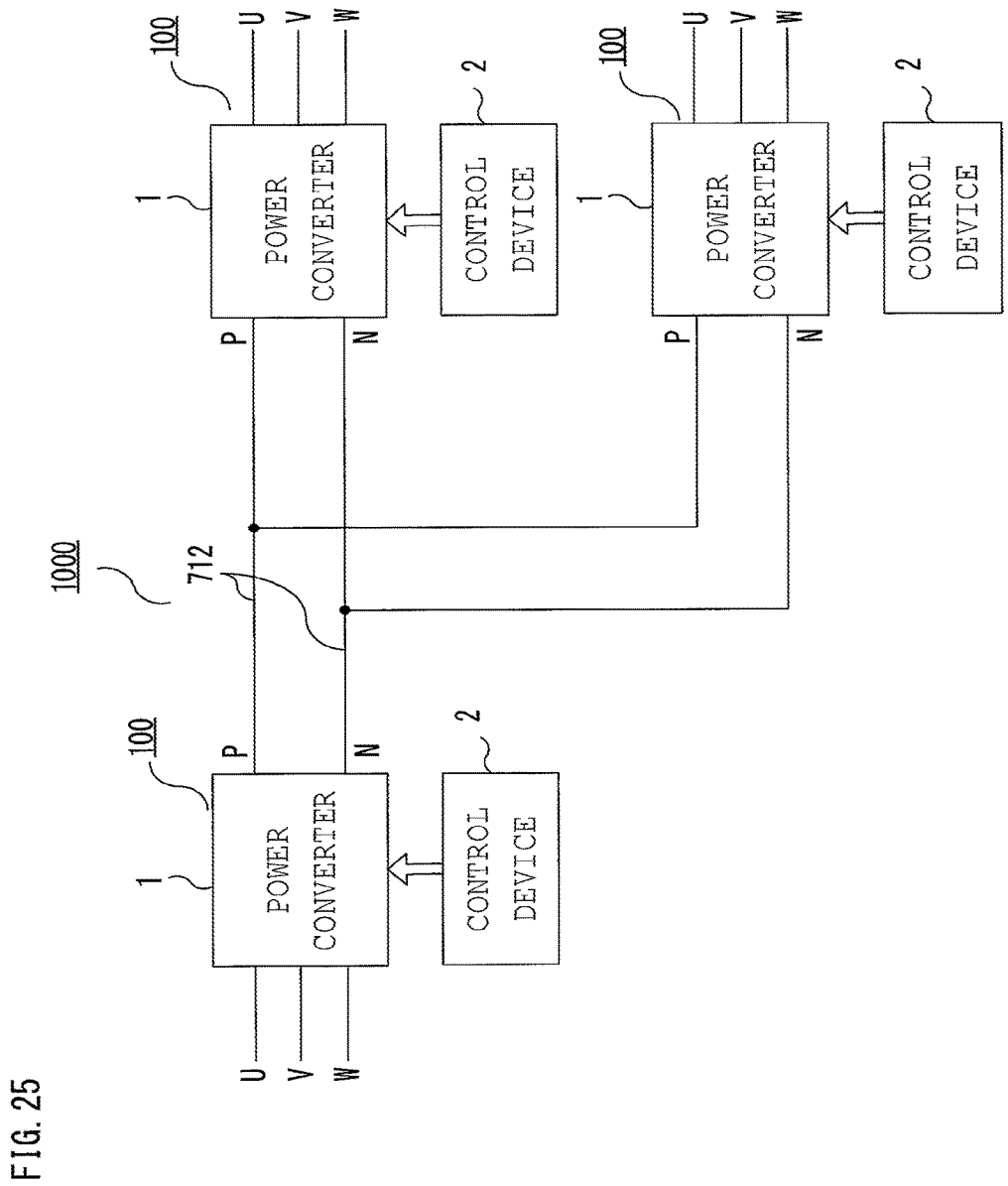
FIG. 25 is a diagram showing a circuit configuration example of a DC power transmission system according to embodiment 7.

FIG. 25 is a diagram showing a circuit configuration example of an electric power system 1000 according to the present embodiment 7.

As shown in FIG. 25, the electric power system 1000 for performing power transmission and distribution and the like, is composed of a plurality of (here, three) electric power conversion devices 100 each including the power converter 1 and the control device 2 as described in embodiment 1. The DC terminals P, N of the power converters 1 of the electric power conversion devices 100 are connected to each other via DC buses 712. Thus, it is possible to perform transmission and reception of DC power between the electric power conversion devices 100, and treat great DC power.

The electric power system 1000 is not limited to the configuration using the electric power conversion device 100 described in embodiment 1, but any of the electric power conversion devices described in the above embodiments 1 to 6 may be used.

Figure 26:
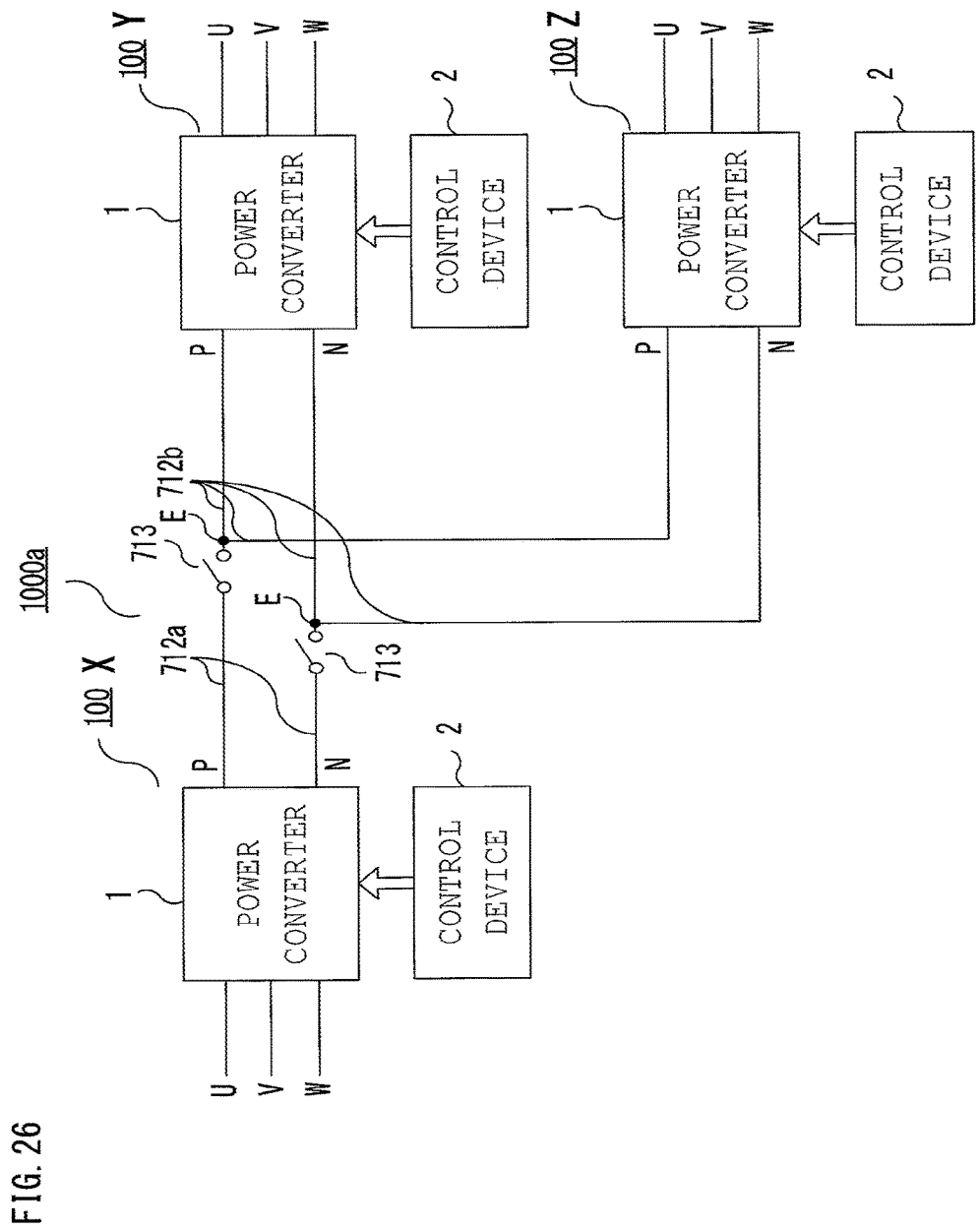
FIG. 26 is a diagram showing another circuit configuration example of a DC power transmission system according to embodiment 7.

FIG. 26 is a diagram showing the configuration of an electric power system 1000a, which is different from the configuration of the electric power system 1000 shown in FIG. 25.

The DC buses 712 leftward in the drawing with respect to branch points E at which DC power branches are referred to as DC buses 712a, and the DC buses 712 rightward in the drawing with respect to the branch points E are referred to as DC buses 712b. At the left in the drawing with respect to the branch points E, open/close devices 713 capable of separating the DC buses 712a from the DC buses 712b are provided. Hereinafter, operation of the electric power system 1000a configured as described above will be described.

For example, it is assumed that short-circuit occurs between the DC terminals P, N of the electric power conversion device 100 (indicated by X) at the left in the drawing. In this case, a control device (not shown) provided to the electric power system 1000a operates the open/close device 713 into an opened state (OFF state) to separate the DC buses 712a from the DC buses 712b. Thus, the two electric power conversion devices 100 (indicated by Y, Z) at the right in the drawing can continue transmission and reception of DC power between the electric power conversion devices 100 (Y, Z) via the separated DC buses 712b.

In this way, even when short-circuit occurs between the DC terminals P, N of the electric power conversion device 100 (X), it is possible to perform transmission and reception of DC power between the electric power conversion devices 100 (Y, Z) where short-circuit does not occur.

Thus, by configuring the electric power system 1000, 1000a using a plurality of the electric power conversion devices described in the above embodiments, it is possible to provide a highly reliable electric power system capable of treating great DC power.

It is noted that, within the scope of the present invention, the above embodiments may be freely combined with each other, or each of the above embodiments may be modified or simplified as appropriate.

The invention claimed is:

1. An electric power conversion device comprising:
a power converter including a plurality of leg circuits connected in parallel between positive and negative DC terminals, each leg circuit including a first arm and a second arm connected in series and being connected to an AC line for each phase, the first arm and the second arm each including at least one converter cell, the power converter performing power conversion between multiphase AC and DC;
a control device for controlling the power converter;
wherein each of the at least one converter cell in the first arm of each leg circuit is a first converter cell having a full-bridge configuration including an energy storing element, a first bridge having upper and lower arms both having semiconductor switching elements, and a second bridge having upper and lower arms both having semiconductor switching elements, and
each of the at least one converter cell in the second arm of each leg circuit is a second converter cell having a half-bridge configuration including an energy storing element and a first bridge having upper and lower arms both having semiconductor switching elements, wherein in steady operation of the power converter, the control device generates voltage commands respectively for the first arm and the second arm of each leg circuit, to perform switching control for the semiconductor switching elements in the first bridges of each first converter cell in the first arm and each second converter cell in the second arm on the basis of the voltage commands, and the control device fixes one of the semiconductor switching element of the upper arm and the semiconductor switching element of the lower arm in the second bridge of each first converter cell in a ON state as an ON-fixed element, and fixes the other one in an OFF state as an OFF-fixed element;

wherein each of the first and second converter cells includes gate drive circuits for driving the corresponding semiconductor switching elements, and the gate drive circuits in the second bridge of each first converter cell have a greater gate resistance value than those of the gate drive circuits in the first bridges of the first and second converter cells.

2. The electric power conversion device according to claim 1, wherein all the converter cells in the first arm of each leg circuit are the first converter cells, and all the converter cells in the second arm of each leg circuit are the second converter cells.

3. The electric power conversion device according to claim 1, wherein
in each first converter cell, the upper arm and the lower arm of the first bridge each include a plurality of the semiconductor switching elements connected in parallel, one of the upper arm and the lower arm of the second bridge includes one or a plurality of the ON-fixed elements connected in parallel, and the other one includes one or a plurality of the OFF-fixed elements connected in parallel, and
a number of the parallel connected ON-fixed elements in the second bridge is not less than a number of the parallel connected OFF-fixed elements, and not greater than a number of the parallel connected semiconductor switching elements of the upper arm in the first bridge or a number of the parallel connected semiconductor switching elements of the lower arm in the first bridge, whichever is lesser.

4. The electric power conversion device according to claim 1, wherein in each first converter cell, rated currents of the semiconductor switching elements of the second bridge are smaller than those of the semiconductor switching elements of the first bridge.

5. The electric power conversion device according to claim 1, wherein the semiconductor switching elements of the first and second converter cells are formed from wide bandgap semiconductors having a greater bandgap than silicon.

6. The electric power conversion device according to claim 1, wherein a connection point between the first arm and the second arm of each leg circuit is connected to an AC terminal for each phase.

7. The electric power conversion device according to claim 1, wherein when short-circuit between the DC terminals is detected, the control device performs output control of each second converter cell of the second arm of each leg circuit so as to perform reactive power compensation operation.

8. The electric power conversion device according to claim 7, wherein the control device controls the reactive power compensation operation using a voltage command on which common DC voltage is superimposed among all phases.

9. The electric power conversion device according to claim 7, wherein the control device controls the reactive power compensation operation using a voltage command on which common AC voltage is superimposed among all phases.

10. The electric power conversion device according to claim 1, wherein when short-circuit between the DC terminals is detected, the control device turns off all the semiconductor switching elements in each first converter cell of the first arm of each leg circuit.

11. The electric power conversion device according to claim 10, wherein a sum of charge voltages of the energy storing elements of the first converter cells connected in a short-circuit current route in the power converter when the DC terminals are short-circuited is higher than voltage between the AC lines.

12. The electric power conversion device according to claim 10, wherein when short-circuit between the DC terminals is detected, the control device performs output control of each second converter cell of the second arm of each leg circuit so as to perform reactive power compensation operation.

13. The electric power conversion device according to claim 10, wherein at least one of the DC terminals is connected to an open/close portion, and when short-circuit between the DC terminals is detected, the control device turns off all the semiconductor switching elements in each first converter cell of the first arm of each leg circuit, and thereafter, operates the open/close portion into an opened state.

14. The electric power conversion device according to claim 13, wherein after operating the open/close portion into an opened state, the control device performs output control of each first converter cell of the first arm of each leg circuit so as to perform reactive power compensation operation.

15. The electric power conversion device according to claim 13, wherein after operating the open/close portion into an opened state, the control device performs output control of each first converter cell and each second converter cell of the first arm and the second arm of each leg circuit so as to perform reactive power compensation operation.

16. The electric power conversion device according to claim 13, wherein the open/close portion is capable of interrupting current smaller than twice rated DC current of the power converter.

17. The electric power conversion device according to claim 13, wherein when short-circuit between the DC terminals is detected, the control device performs output control of each second converter cell of the second arm of each leg circuit so as to perform reactive power compensation operation.

18. An electric power system comprising a plurality of electric power conversion devices,
each electric power conversion device comprising:
a power converter including a plurality of leg circuits connected in parallel between positive and negative DC terminals, each leg circuit including a first arm and a second arm connected in series and being connected to an AC line for each phase, the first arm and the second arm each including at least one converter cell, the power converter performing power conversion between multiphase AC and DC;
a control device for controlling the power converter;

wherein each of the at least one converter cell in the first arm of each leg circuit is a first converter cell having a full-bridge configuration including an energy storing element, a first bridge having upper and lower arms both having semiconductor switching elements, and a second bridge having upper and lower arms both having semiconductor switching elements, and each of the at least one converter cell in the second arm of each leg circuit is a second converter cell having a half-bridge configuration including an energy storing element and a first bridge having upper and lower arms both having semiconductor switching elements, wherein in steady operation of the power converter, the control device generates voltage commands respectively for the first arm and the second arm of each leg circuit, to perform switching control for the semiconductor switching elements in the first bridges of each first converter cell in the first arm and each second converter cell in the second arm on the basis of the voltage commands, and the control device fixes one of the semiconductor switching element of the upper arm and the semiconductor switching element of the lower arm in the second bridge of each first converter cell in a ON state as an ON-fixed element, and fixes the other one in an OFF state as an OFF-fixed element, wherein the DC terminals of the power converters of the electric power conversion devices are connected to each other;

wherein each of the first and second converter cells includes gate drive circuits for driving the corresponding semiconductor switching elements, and the gate drive circuits in the second bridge of each first converter cell have a greater gate resistance value than those of the gate drive circuits in the first bridges of the first and second converter cells.

\* \* \* \* \*